United States Patent
Okazaki et al.

(10) Patent No.: US 9,624,811 B2
(45) Date of Patent: Apr. 18, 2017

(54) CONTROL DEVICE OF INTERNAL COMBUSTION ENGINE

(71) Applicant: TOYOTA JIDOSHA KABUSHIKI KAISHA, Toyota-shi, Aichi (JP)

(72) Inventors: Shuntaro Okazaki, Shizuoka (JP); Norihisa Nakagawa, Susono (JP); Yuji Yamaguchi, Susono (JP); Takahiko Fujiwara, Shizuoka (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/026,365

(22) PCT Filed: Sep. 30, 2014

(86) PCT No.: PCT/JP2014/076645
§ 371 (c)(1),
(2) Date: Mar. 31, 2016

(87) PCT Pub. No.: WO2015/050268
PCT Pub. Date: Apr. 9, 2015

(65) Prior Publication Data
US 2016/0245145 A1    Aug. 25, 2016

(30) Foreign Application Priority Data
Oct. 2, 2013 (JP) ................................. 2013-207655

(51) Int. Cl.
*F01N 3/00* (2006.01)
*F01N 11/00* (2006.01)
(Continued)

(52) U.S. Cl.
CPC ............ *F01N 11/007* (2013.01); *F01N 3/101* (2013.01); *F02D 41/0295* (2013.01);
(Continued)

(58) Field of Classification Search
USPC .................. 60/274, 276, 277, 285, 286, 299
See application file for complete search history.

(56) References Cited

U.S. PATENT DOCUMENTS 5,678,402 A    10/1997    Kitagawa et al.
5,724,809 A    3/1998    Mitsutani et al.
(Continued)

FOREIGN PATENT DOCUMENTS

EP    2 667 003 A1    11/2013
EP    2 952 715 A1    12/2015
(Continued)

*Primary Examiner* — Binh Q Tran
(74) *Attorney, Agent, or Firm* — Andrews Kurth Kenyon LLP

(57) ABSTRACT

A control device of an internal combustion engine which is provided with an exhaust purification catalyst is provided with a downstream side air-fuel ratio sensor, a feed control means for controlling the fuel feed amount so that the air-fuel ratio of the exhaust gas becomes a target air-fuel ratio, and an excess/deficiency estimating means which estimates an oxygen excess/deficiency in the exhaust gas. The target air-fuel ratio is switched to a lean air-fuel ratio when the output air-fuel ratio of the downstream side air-fuel ratio sensor becomes a rich air-fuel ratio and is switched to the rich air-fuel ratio when the stored amount of oxygen of the exhaust purification catalyst after this becomes a switching reference amount or more. An absolute value of cumulative oxygen excess/deficiency at a time period during which the target air-fuel ratio is made the lean air-fuel ratio and an absolute value of cumulative oxygen excess/deficiency at a time period during which the target air-fuel ratio is made the rich air-fuel ratio are used as the basis to correct the target air-fuel ratio etc. so that the difference of these absolute values becomes small.

12 Claims, 14 Drawing Sheets

(51) Int. Cl.
*F01N 3/10* (2006.01)
*F02D 41/02* (2006.01)
*F02D 41/12* (2006.01)
*F02D 41/14* (2006.01)
*F02D 41/24* (2006.01)
*B01D 53/94* (2006.01)
*F01N 13/00* (2010.01)

(52) U.S. Cl.
CPC ....... *F02D 41/123* (2013.01); *F02D 41/1441* (2013.01); *F02D 41/2461* (2013.01); *B01D 53/9445* (2013.01); *B01D 53/9495* (2013.01); *B01D 2255/908* (2013.01); *F01N 13/0093* (2014.06); *F01N 2430/02* (2013.01); *F01N 2430/06* (2013.01); *F01N 2560/025* (2013.01); *F01N 2560/14* (2013.01); *F01N 2900/0408* (2013.01); *F01N 2900/0418* (2013.01); *F01N 2900/1402* (2013.01); *F01N 2900/1624* (2013.01); *F02D 41/126* (2013.01); *F02D 41/1475* (2013.01); *F02D 2200/0814* (2013.01); *Y02T 10/22* (2013.01)

(56) References Cited

U.S. PATENT DOCUMENTS

| | | | |
|---|---|---|---|
| 5,758,490 A | 6/1998 | Maki et al. | |
| 5,983,629 A * | 11/1999 | Sawada | F01N 11/007 60/276 |
| 6,018,945 A * | 2/2000 | Nakagawa | F02D 41/1441 123/691 |
| 8,554,450 B2 * | 10/2013 | Takada | F02D 41/1441 123/672 |
| 8,893,473 B2 * | 11/2014 | Nakata | F02D 41/1441 60/276 |
| 9,188,072 B2 * | 11/2015 | Tomimatsu | F02D 17/02 |
| 2013/0338904 A1 | 12/2013 | Onoe et al. | |
| 2015/0152769 A1 * | 6/2015 | Aoki | F02D 41/0235 73/114.75 |

FOREIGN PATENT DOCUMENTS

| | | |
|---|---|---|
| JP | H4-001440 A | 1/1992 |
| JP | H4-091341 A | 3/1992 |
| JP | H7-259602 A | 10/1995 |
| JP | H8-232723 A | 9/1996 |
| JP | H9-151765 A | 6/1997 |
| JP | H9-250383 A | 9/1997 |
| JP | 2001-234787 A | 8/2001 |
| JP | 2003-206784 A | 7/2003 |
| JP | 2004-019467 A | 1/2004 |
| JP | 2004-116344 A | 4/2004 |
| JP | 2004-137908 A | 5/2004 |
| JP | 2005-188330 A | 7/2005 |
| JP | 2005-194927 A | 7/2005 |
| JP | 2009-162139 A | 7/2009 |
| JP | 2011-069337 A | 4/2011 |
| WO | 2012/098641 A1 | 7/2012 |
| WO | 2014/118892 A1 | 8/2014 |

* cited by examiner

FIG. 2
(A)
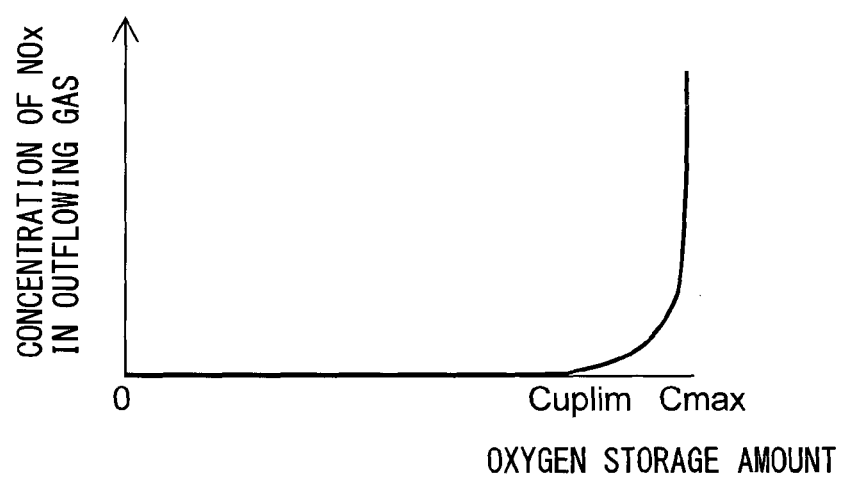
(B)
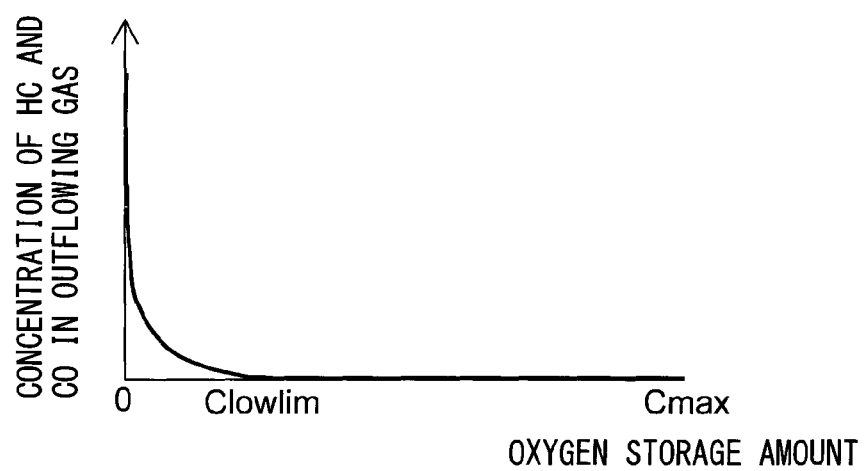

CONTROL DEVICE OF INTERNAL COMBUSTION ENGINE

CROSS-REFERENCE TO RELATED APPLICATIONS

This is a national phase application based on the PCT International Patent Application No. PCT/JP2014/076645 filed Sep. 30, 2014, claiming priority to Japanese Patent Application No. 2013-207655 filed Oct. 2, 2013, the entire contents of both of which are incorporated herein by reference.

TECHNICAL FIELD

The present invention relates to a control device of an internal combustion engine.

In the past, there has been widely known a control device of an internal combustion engine which provides an air-fuel ratio sensor in an exhaust passage of an internal combustion engine and uses the output of this air-fuel ratio sensor as the basis to control the amount of fuel which is fed to the internal combustion engine (for example, see PLTs 1 to 5).

In an internal combustion engine in which such a control device is used, an exhaust purification catalyst which is provided in the exhaust passage and has an oxygen storage ability is used. An exhaust purification catalyst which has an oxygen storage ability can remove the unburned gas (HC, CO, etc.) or $NO_x$ etc. in the exhaust gas which flows into exhaust purification catalyst when the stored amount of oxygen is a suitable amount between a maximum storable oxygen amount (upper limit storage amount) and zero (lower limit storage amount). That is, if exhaust gas with an air-fuel ratio at the rich side from the stoichiometric air-fuel ratio (below, also referred to as the "rich air-fuel ratio") flows into the exhaust purification catalyst, the oxygen which is stored in the exhaust purification catalyst is used to remove the unburned gas in the exhaust gas by oxidation. Conversely, if exhaust gas with an air-fuel ratio at the lean side from the stoichiometric air-fuel ratio (below, also referred to as the "lean air-fuel ratio") flows into the exhaust purification catalyst, the oxygen in the exhaust gas is stored in the exhaust purification catalyst. Due to this, the surface of the exhaust purification catalyst becomes an oxygen deficient state. Along with this, the $NO_x$ in the exhaust gas is removed by reduction. As a result, the exhaust purification catalyst can purify the exhaust gas so long as the stored amount of oxygen is a suitable amount regardless of the air-fuel ratio of the exhaust gas which flows into exhaust purification catalyst.

Therefore, in such a control device, to maintain the stored amount of oxygen at the exhaust purification catalyst at a suitable amount, an air-fuel ratio sensor is provided at the upstream side of the exhaust purification catalyst in the exhaust flow direction and an oxygen sensor is provided at the downstream side in the exhaust flow direction. Using these sensors, the control device, for example, uses the output of the upstream side air-fuel ratio sensor as the basis for feedback control so that the output of this air-fuel ratio sensor becomes a target value which corresponds to the target air-fuel ratio (for example, PLTs 1 to 4). In addition, it uses the output of the downstream side oxygen sensor as the basis to correct the target value of the upstream side air-fuel ratio sensor. Note that, in the following explanation, the upstream side in the exhaust flow direction will sometimes be referred to as "the upstream side" and the downstream side in the exhaust flow direction will sometimes be referred to as "the downstream side".

For example, in the control device which is described in PLT 1, when the output voltage of the downstream side oxygen sensor is a high side threshold value or more and the state of the exhaust purification catalyst is an oxygen deficient state, the target air-fuel ratio of the exhaust gas which flows into exhaust purification catalyst is made the lean air-fuel ratio. Conversely, when the output voltage of the downstream side oxygen sensor is a low side threshold value or less and the exhaust purification catalyst is an oxygen excess state, the target air-fuel ratio is made the rich air-fuel ratio. According to PLT 1, it is considered that due to this, when in a oxygen deficient state or oxygen excess state, the exhaust purification catalyst can be quickly returned to a state between these two states (that is, a state where the exhaust purification catalyst stores a suitable amount of oxygen).

In addition, in the above control device, when the output voltage of the downstream side oxygen sensor is between the high side threshold value and the low side threshold value, the target air-fuel ratio is made the lean air-fuel ratio when the output voltage of the oxygen sensor is increasing as a general trend. Conversely, the target air-fuel ratio is made the rich air-fuel ratio when the output voltage of the oxygen sensor is decreasing as a general trend. According to PLT 1, due to this, it is considered that the exhaust purification catalyst can be prevented from becoming an oxygen deficient state or oxygen excess state in advance.

Further, in the control device which is described in PLT 2, the outputs of the air flow meter and the air-fuel ratio sensor at the upstream side of the exhaust purification catalyst etc. are used as the basis to calculate the stored amount of oxygen of the exhaust purification catalyst. On top of this, when the calculated stored amount of oxygen is larger than the target stored amount of oxygen, the target air-fuel ratio of the exhaust gas which flows into the exhaust purification catalyst is made the rich air-fuel ratio, while when the calculated stored amount of oxygen is smaller than the target stored amount of oxygen, the target air-fuel ratio is made the lean air-fuel ratio. According to PLT 2, due to this, the stored amount of oxygen of the exhaust purification catalyst can be maintained constant at the target stored amount of oxygen.

CITATIONS LIST

Patent Literature

PLT 1. Japanese Patent Publication No. 2011 069337A
PLT 2. Japanese Patent Publication No. 2001 234787A
PLT 3. Japanese Patent Publication No. 8 232723A
PLT 4. Japanese Patent Publication No. 2009 162139A

SUMMARY OF INVENTION

Technical Problem

In this regard, in the control which is described in PLT 1, when the output voltage of the downstream side oxygen sensor is the low side threshold value or less, the target air-fuel ratio is made the rich air-fuel ratio. For this reason, in the control which is described in PLT 1, it can be said that oxygen and $NO_x$ temporarily flow out from the exhaust purification catalyst. Further, when performing the control which is described in PLT 2, due to error in estimation relating to the stored amount of oxygen of the exhaust purification catalyst, the stored amount of oxygen becomes off from the target stored amount and as a result oxygen and $NO_x$ sometimes end up flowing out from the exhaust purification catalyst.

Therefore, the present inventors propose the following control device of an internal combustion engine. In this control device, the air-fuel ratio of the exhaust gas which flows into exhaust purification catalyst is made to become the target air-fuel ratio by feedback control of the injected amount of fuel which is fed to the combustion chamber of the internal combustion engine. The target air-fuel ratio is switched to the lean air-fuel ratio when the air-fuel ratio which is detected by the downstream side air-fuel ratio sensor becomes a rich judgment air-fuel ratio which is richer than the stoichiometric air-fuel ratio or less. After this, when the stored amount of oxygen of the exhaust purification catalyst becomes a predetermined switching reference storage amount or more, the target air-fuel ratio is switched to the rich air-fuel ratio. Due to this, it is possible to suppress outflow of $NO_x$ and oxygen from the exhaust purification catalyst.

In this regard, when the internal combustion engine has a plurality of cylinders, sometimes offset occurs among the cylinders in the air-fuel ratio of the exhaust gas which is exhausted from the cylinders. In such a case, offset occurs between the average air-fuel ratio of the exhaust gas which is exhausted from all of the cylinders and the air-fuel ratio which is detected by the upstream side air-fuel ratio sensor in accordance with the set position of the upstream side air-fuel ratio sensor. As a result, the air-fuel ratio which is detected by the upstream side air-fuel ratio sensor becomes offset to the rich side or lean side from the average air-fuel ratio of the actual exhaust gas. If offset occurs in the output value of the upstream side air-fuel ratio sensor in this way, when making the target air-fuel ratio the lean air-fuel ratio, sometimes the stored amount of oxygen of the exhaust purification catalyst reaches the maximum storable oxygen amount and $NO_x$ and oxygen end up flowing out from the exhaust purification catalyst.

Further, the inventors etc. also proposed control opposite to the above control. This "opposite control" is control which switches the target air-fuel ratio to the rich air-fuel ratio when the detected air-fuel ratio of the downstream side air-fuel ratio sensor becomes a lean air-fuel ratio and switches the target air-fuel ratio to the lean air-fuel ratio when the stored amount of oxygen of the exhaust purification catalyst becomes the switching reference amount or less. When performing such control as well, if sometimes offset occurs in the output value of the upstream side air-fuel ratio sensor, unburned gas ends up flowing out from the exhaust purification catalyst in some cases.

Therefore, an object of the present invention, in consideration of the above problem, is to provide a control device of an internal combustion engine which can suppress the outflow of $NO_x$ or unburned gas from an exhaust purification catalyst even when offset occurs in an output value of an upstream side air-fuel ratio sensor etc.

Solution to Problem

To solve this problem, in a first aspect of the invention, there is provided a control device of an internal combustion engine comprising an exhaust purification catalyst which is arranged in an exhaust passage of an internal combustion engine and which can store oxygen, which control device of an internal combustion engine comprises a downstream side air-fuel ratio detection device which is arranged at a downstream side of the exhaust purification catalyst in the exhaust flow direction and which detects an air-fuel ratio of exhaust gas flowing out from the exhaust purification catalyst, feed control means for controlling the feed of fuel which is fed to a combustion chamber of the internal combustion engine, and an excess/deficiency estimating means for estimating an oxygen excess/deficiency in the exhaust gas flowing into exhaust purification catalyst, wherein the feed control means performs feedback control on the feed of fuel fed to the combustion chamber of the internal combustion engine so that the air-fuel ratio of the exhaust gas which flows into exhaust purification catalyst becomes a target air-fuel ratio, and when an air-fuel ratio detected by the downstream side air-fuel ratio detection device reaches a judgment air-fuel ratio which is offset to one side of either a rich side or lean side from the stoichiometric air-fuel ratio, the target air-fuel ratio is switched to an air-fuel ratio which is offset to the other side at an opposite side to that one side from the stoichiometric air-fuel ratio and when an amount of change of the stored amount of oxygen of the exhaust purification catalyst after the target air-fuel ratio is switched becomes a predetermined switching reference amount or more, said target air-fuel ratio is switched to an air-fuel ratio which is offset to the one side from the stoichiometric air-fuel ration, and wherein an absolute value of cumulative oxygen excess/deficiency at a first time period from which the target air-fuel ratio is switched to an air-fuel ratio which is offset to the other side from the stoichiometric air-fuel ratio to when the amount of change of the stored amount of oxygen becomes the switching reference amount or more, constituting a first cumulative value of amount of oxygen, and an absolute value of cumulative oxygen excess/deficiency at a second time period from which the target air-fuel ratio is switched to an air-fuel ratio which is offset to the one side from the stoichiometric air-fuel ratio to when the air-fuel ratio detected by the downstream side air-fuel ratio detection device becomes the judgment air-fuel ratio or less, constituting a second cumulative value of amount of oxygen, are used as the basis to correct a parameter relating to the air-fuel ratio so that a difference between these first cumulative value of amount of oxygen and second cumulative value of amount of oxygen becomes smaller.

In a second aspect of the invention, there is provided the first aspect of the invention wherein the parameter relating to the air-fuel ratio is corrected based on the first cumulative value of amount of oxygen at a first time period and the second cumulative value of amount of oxygen at a second time period following right after the first time period.

In a third aspect of the invention, there is provided the first or second aspect of the invention wherein a difference of the first cumulative value of amount of oxygen and the second cumulative value of amount of oxygen is used as the basis to calculate a learning value and where the learning value is used as the basis to correct the parameter relating to the air-fuel ratio and the learning value is stored in a storage medium which is not erased even if an ignition switch of a vehicle which carries the internal combustion engine is turned to off.

In a fourth aspect of the invention, there is provided any one of the first to third aspects of the invention wherein the one side is a rich side and the other side is a lean side.

In a fifth aspect of the invention, there is provided any one of the first to fourth aspects of the invention wherein the control device further comprises an upstream side air-fuel ratio detection device which is arranged at an upstream side of the exhaust purification catalyst in the exhaust flow direction and which detects the air-fuel ratio of the exhaust gas which flows into exhaust purification catalyst, and the excess/deficiency estimating means uses the air-fuel ratio detected by the upstream side air-fuel ratio detection device and the flow rate of the exhaust gas flowing into the exhaust purification catalyst or fuel injection amount as the basis to estimate the oxygen excess/deficiency.

In a sixth aspect of the invention, there is provided any one of the first to fifth aspects of the invention wherein the feed control means suspends the feedback control when a feedback control suspension condition stands and wherein in the case where the feedback control is suspended during the second time period and, when an absolute value of cumulative oxygen excess/deficiency during a partial second time period from when the target air-fuel ratio is switched from the air-fuel ratio at the one side from the stoichiometric air-fuel ratio to when the feedback control is suspended, constituting a partial second cumulative value of amount of oxygen, is larger than the first cumulative value of amount of oxygen in the first time period right before the second time period, a parameter relating to the air-fuel ratio is corrected so that the difference between the first cumulative value of amount of oxygen and the partial second cumulative value of amount of oxygen becomes smaller.

In a seventh aspect of the invention, there is provided the sixth aspect of the invention wherein even if the feedback control is suspended during the second time period, when the partial second cumulative value of amount of oxygen is smaller than the first cumulative value of amount of oxygen in the first time period right before the partial second time period, the parameter relating to the air-fuel ratio is not corrected.

In an eighth aspect of the invention, there is provided the sixth or seventh aspect of the invention wherein the feedback control suspension condition is at least one of execution of fuel cut control which suspends the feed of fuel to the inside of the combustion chamber during operation of the internal combustion engine, execution of feed increase control which temporarily increases the feed of fuel to the inside of the combustion chamber, and shutdown of the internal combustion engine by an engine automatic shutdown/startup device.

In a ninth aspect of the invention, there is provided any one of the first to eighth aspects of the invention wherein the parameter relating to the air-fuel ratio is the target air-fuel ratio or fuel feed amount.

In a 10th aspect of the invention, there is provided any one of the first to eighth aspects of the invention wherein the parameter relating to the air-fuel ratio is the air-fuel ratio serving as the center of control.

In an 11th aspect of the invention, there is provided the 10th aspect of the invention wherein the air-fuel ratio serving as the center of control is the stoichiometric air-fuel ratio.

In a 12th aspect of the invention, there is provided any one of the first to eighth aspects of the invention wherein the control device is further provided with an upstream side air-fuel ratio detection device which is arranged at an upstream side of the exhaust purification catalyst in the exhaust flow direction and which detects the air-fuel ratio of the exhaust gas flowing into exhaust purification catalyst, the feed control means controls, by feedback control, the amount of feed of fuel which is fed to the combustion chamber of the internal combustion engine so that the air-fuel ratio detected by the upstream side air-fuel ratio detection device becomes a target air-fuel ratio, and the parameter relating to the air-fuel ratio is the output value of the upstream side air-fuel ratio detection device.

Advantageous Effects of Invention

According to the present invention, there is provided a control device of an internal combustion engine where it is possible to suppress the outflow of $NO_x$ from the exhaust purification catalyst even if offset occurs in the output value of the upstream side air-fuel ratio sensor etc.

BRIEF DESCRIPTION OF DRAWINGS

FIG. 2 is a view which shows the relationship between the stored amount of oxygen of the exhaust purification catalyst and concentration of $NO_x$ or concentration of HC or CO in the exhaust gas which flows out from the exhaust purification catalyst.

DESCRIPTION OF EMBODIMENTS

Figure 1:
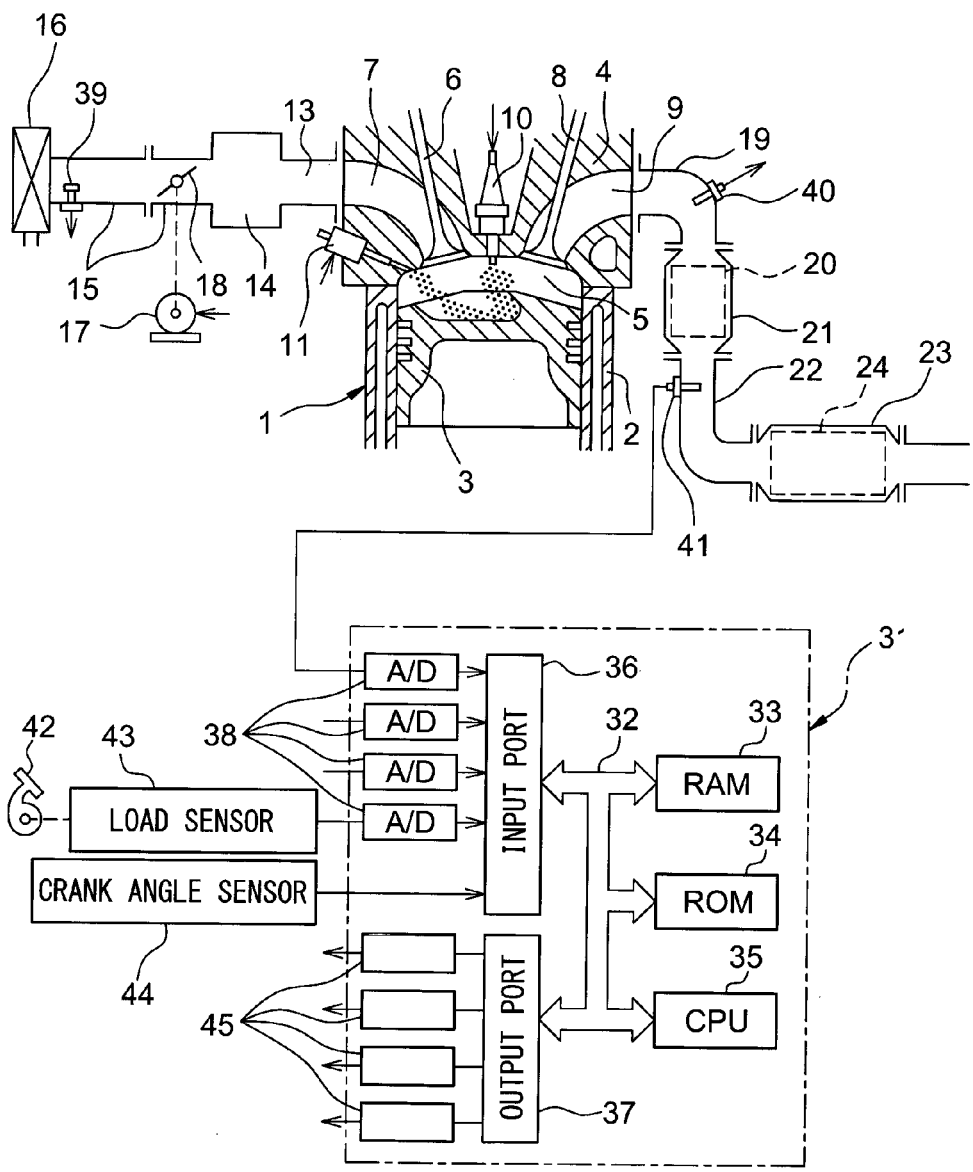
FIG. 1 is a view which schematically shows an internal combustion engine in which a control device of the present invention is used.

Below, referring to the drawings, a control device of an internal combustion engine of the present invention will be explained in detail. Note that, in the following explanation, similar component elements are assigned the same reference numerals. FIG. 1 is a view which schematically shows an internal combustion engine in which a control device according to a first embodiment of the present invention is used.

<Explanation of Internal Combustion Engine as a Whole>

Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine of the present invention may also use another fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor (upstream side air-fuel ratio detecting means) 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor (downstream side air-fuel ratio detecting means) 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17.

Note that, the internal combustion engine according to the present embodiment is a non-supercharged internal combustion engine which is fueled by gasoline, but the internal combustion engine according to the present invention is not limited to the above configuration. For example, the internal combustion engine according to the present invention may have a number of cylinders, cylinder array, state of injection of fuel, configuration of intake and exhaust systems, configuration of valve mechanism, presence of supercharger, supercharged state, etc. which are different from the above internal combustion engine.

<Explanation of Exhaust Purification Catalyst>

The upstream side exhaust purification catalyst 20 and downstream side exhaust purification catalyst 24 in each case have similar configurations. The exhaust purification catalysts 20 and 24 are three-way catalysts which have oxygen storage abilities. Specifically, the exhaust purification catalysts 20 and 24 are comprised of carriers which are comprised of ceramic on which a precious metal which has a catalytic action (for example, platinum (Pt)) and a substance which has an oxygen storage ability (for example, ceria ($CeO_2$)) are carried. The exhaust purification catalysts 20 and 24 exhibit a catalytic action of simultaneously removing unburned gas (HC, CO, etc.) and nitrogen oxides ($NO_x$) when reaching a predetermined activation temperature and, in addition, an oxygen storage ability.

According to the oxygen storage ability of the exhaust purification catalysts 20 and 24, the exhaust purification catalysts 20 and 24 store the oxygen in the exhaust gas when the air-fuel ratio of the exhaust gas which flows into the exhaust purification catalysts 20 and 24 is leaner than the stoichiometric air-fuel ratio (lean air-fuel ratio). On the other hand, the exhaust purification catalysts 20 and 24 release the oxygen which is stored in the exhaust purification catalysts 20 and 24 when the inflowing exhaust gas has an air-fuel ratio which is richer than the stoichiometric air-fuel ratio (rich air-fuel ratio).

The exhaust purification catalysts 20 and 24 have a catalytic action and oxygen storage ability and thereby have the action of removing $NO_x$ and unburned gas according to the stored amount of oxygen. That is, as shown in FIG. 2A, when the air-fuel ratio of the exhaust gas which flows into the exhaust purification catalysts 20 and 24 is a lean air-fuel ratio, when the stored amount of oxygen is small, the exhaust purification catalysts 20 and 24 store the oxygen in the exhaust gas. Further, along with this, the $NO_x$ in the exhaust gas is removed by reduction. Further, if the stored amount of oxygen becomes larger, the exhaust gas which flows out from the exhaust purification catalysts 20 and 24 rapidly rises in concentration of oxygen and $NO_x$ at a certain stored amount near the maximum storable oxygen amount Cmax (in the figure, Cuplim).

On the other hand, as shown in FIG. 2B, when the air-fuel ratio of the exhaust gas which flows into the exhaust purification catalysts 20 and 24 is the rich air-fuel ratio, when the stored amount of oxygen is large, the oxygen which is stored in the exhaust purification catalysts 20 and 24 is released, and the unburned gas in the exhaust gas is removed by oxidation. Further, if the stored amount of oxygen becomes small, the exhaust gas which flows out from the exhaust purification catalysts 20 and 24 rapidly rises in concentration of unburned gas at a certain stored amount near zero (in the figure, Clowlim).

In the above way, according to the exhaust purification catalysts 20 and 24 which are used in the present embodiment, the characteristics of removal of $NO_x$ and unburned gas in the exhaust gas change depending on the air-fuel ratio and stored amount of oxygen of the exhaust gas which flows into the exhaust purification catalysts 20 and 24. Note that, if having a catalytic action and oxygen storage ability, the exhaust purification catalysts 20 and 24 may also be catalysts different from three-way catalysts.

<Configuration of Air-Fuel Ratio Sensor>

Figure 3:
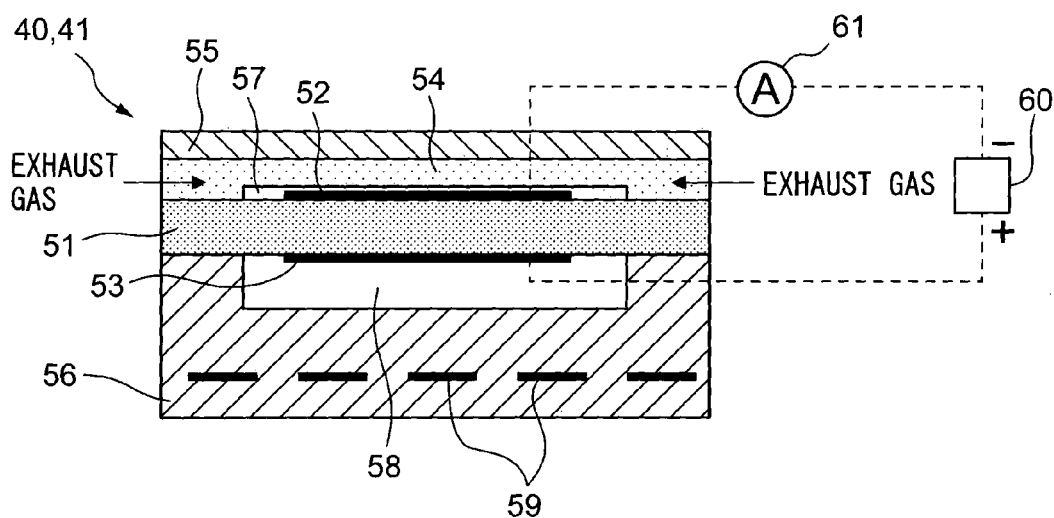
FIG. 3 is a schematic cross-sectional view of an air-fuel ratio sensor.

Next, referring to FIG. 3, the configurations of air-fuel ratio sensors 40 and 41 in the present embodiment will be explained. FIG. 3 is a schematic cross-sectional view of air-fuel ratio sensors 40 and 41. As will be understood from FIG. 3, the air-fuel ratio sensors 40 and 41 in the present embodiment are single-cell type air-fuel ratio sensors each comprised of a solid electrolyte layer and a pair of electrodes forming a single cell.

As shown in FIG. 3, each of the air-fuel ratio sensors 40 and 41 is provided with a solid electrolyte layer 51, an exhaust side electrode (first electrode) 52 which is arranged at one side surface of the solid electrolyte layer 51, an atmosphere side electrode (second electrode) 53 which is arranged at the other side surface of the solid electrolyte layer 51, a diffusion regulation layer 54 which regulates the diffusion of the passing exhaust gas, a protective layer 55 which protects the diffusion regulation layer 54, and a heater part 56 which heats the air-fuel ratio sensor 40 or 41.

On one side surface of the solid electrolyte layer 51, a diffusion regulation layer 54 is provided. On the side surface of the diffusion regulation layer 54 at the opposite side from the side surface of the solid electrolyte layer 51 side, a protective layer 55 is provided. In the present embodiment, a measured gas chamber 57 is formed between the solid electrolyte layer 51 and the diffusion regulation layer 54. In this measured gas chamber 57, the gas to be detected by the air-fuel ratio sensors 40 and 41, that is, the exhaust gas, is introduced through the diffusion regulation layer 54. Further, the exhaust side electrode 52 is arranged inside the measured gas chamber 57, therefore, the exhaust side electrode 52 is exposed to the exhaust gas through the diffusion regulation layer 54. Note that, the measured gas chamber 57 does not necessarily have to be provided. The diffusion regulation layer 54 may directly contact the surface of the exhaust side electrode 52.

On the other side surface of the solid electrolyte layer 51, the heater part 56 is provided. Between the solid electrolyte layer 51 and the heater part 56, a reference gas chamber 58 is formed. Inside this reference gas chamber 58, a reference gas is introduced. In the present embodiment, the reference gas chamber 58 is open to the atmosphere. Therefore, inside the reference gas chamber 58, the atmosphere is introduced as the reference gas. The atmosphere side electrode 53 is arranged inside the reference gas chamber 58, therefore, the atmosphere side electrode 53 is exposed to the reference gas (reference atmosphere).

The heater part 56 is provided with a plurality of heaters 59. These heaters 59 can be used to control the temperature of the air-fuel ratio sensor 40 or 41, in particular, the temperature of the solid electrolyte layers 51. The heater part 56 has a sufficient heat generation capacity for heating the solid electrolyte layer 51 until activating.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor voltage Vr is supplied by the voltage supply device 60 which is mounted on the ECU 31. In addition, the ECU 31 is provided with a current detection device 61 which detects the current which flows between these electrodes 52 and 53 through the solid electrolyte layer 51 when the voltage supply device 60 supplies the sensor voltage Vr. The current which is detected by this current detection device 61 is the output current of the air-fuel ratio sensors 40 and 41.

Figure 4:
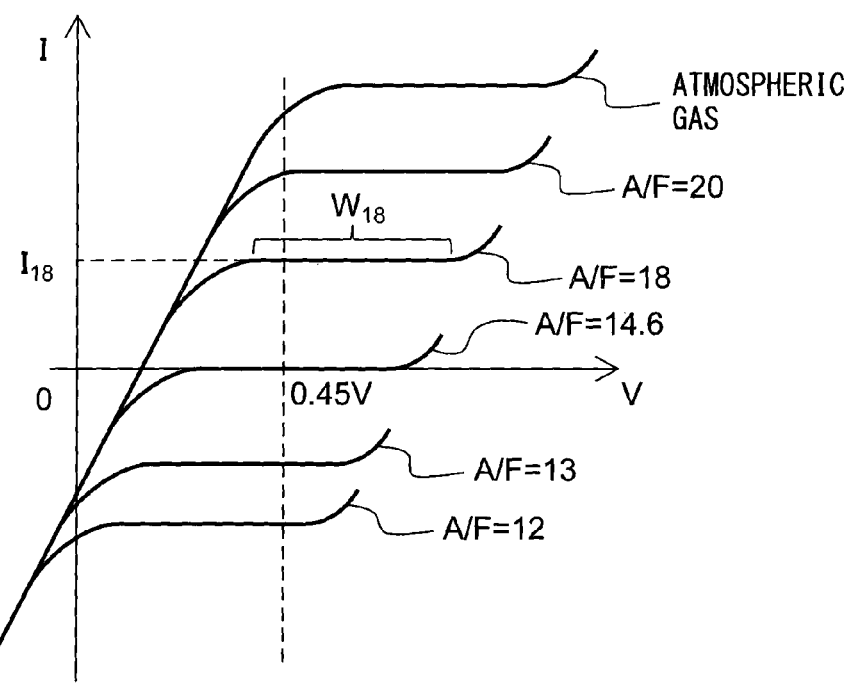
FIG. 4 is a view which shows the relationship between the voltage supplied to the sensor and output current at different exhaust air-fuel ratios.

The thus configured air-fuel ratio sensors 40 and 41 have the voltage-current (V-I) characteristic such as shown in FIG. 4. As will be understood from FIG. 4, the output current I becomes larger the higher the exhaust air-fuel ratio (the leaner). Further, at the line V-I of each exhaust air-fuel ratio, there is a region parallel to the V axis, that is, a region where the output current does not change much at all even if the sensor voltage changes. This voltage region is called the "limit current region". The current at this time is called the "limit current". In FIG. 4, the limit current region and limit current when the exhaust air-fuel ratio is 18 are shown by $W_{18}$ and $I_{18}$.

Figure 5:
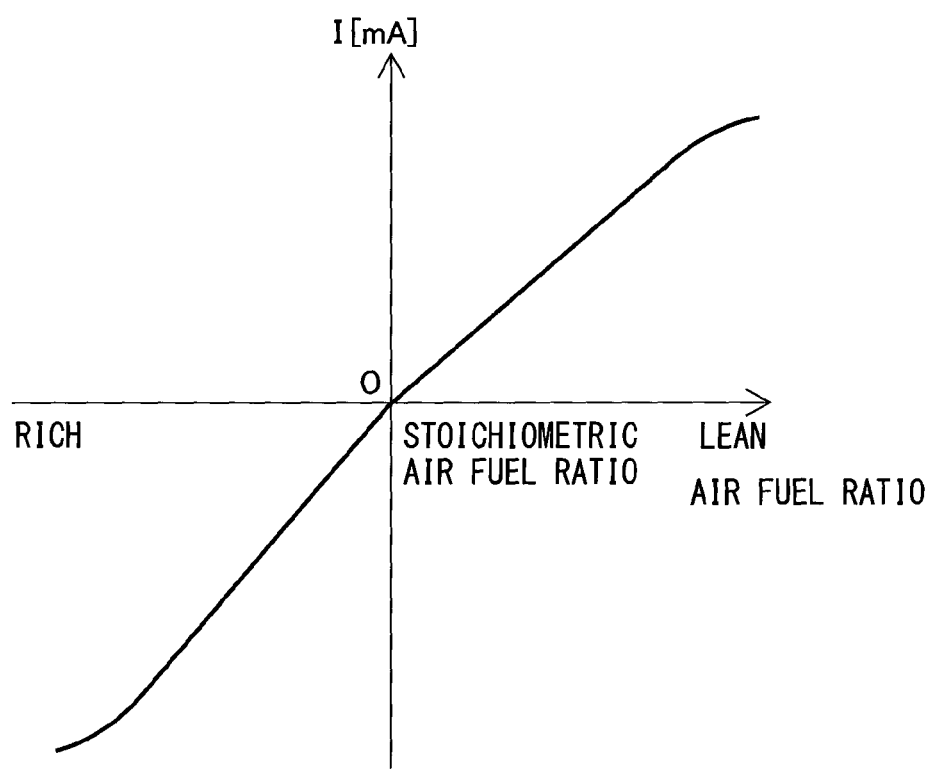
FIG. 5 is a view which shows the relationship between the exhaust air-fuel ratio and output current when making the voltage supplied to the sensor constant.

FIG. 5 is a view which shows the relationship between the exhaust air-fuel ratio and the output current I when making the supplied voltage constant at about 0.45V. As will be understood from FIG. 5, in the air-fuel ratio sensors 40 and 41, the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

Note that, in the above example, as the air-fuel ratio sensors 40 and 41, limit current type air-fuel ratio sensors of the structure which is shown in FIG. 3 are used. However, as the upstream side air-fuel ratio sensor 40, for example, it is also possible to use a cup-type limit current type air-fuel ratio sensor or other structure of limit current type air-fuel ratio sensor or air-fuel ratio sensor not a limit current type or any other air-fuel ratio sensor.

<Basic Air Fuel Ratio Control>

Next, an outline of the basic air-fuel ratio control in a control device of an internal combustion engine of the present invention will be explained. In the present embodiment, the output current Irup of the upstream side air-fuel ratio sensor 40 is used as the basis for feedback control so that the output current Irup of the upstream side air-fuel ratio sensor 40 (corresponding to air-fuel ratio of exhaust gas which flows into exhaust purification catalyst) becomes a value which corresponds to the target air-fuel ratio.

On the other hand, in the present embodiment, the output current of the downstream side air-fuel ratio sensor 41 etc. are used as the basis for control for setting the target air-fuel ratio. In control for setting the target air-fuel ratio, when the output current Irdwn of the downstream side air-fuel ratio sensor 41 becomes the rich judgment reference value Irrich or less, the target air-fuel ratio is made the lean set air-fuel ratio. After this, it is maintained at this air-fuel ratio. Here, the rich judgment reference value Irrich is a value which corresponds to a predetermined rich judgment air-fuel ratio which is slightly richer than the stoichiometric air-fuel ratio (for example, 14.55). Further, the lean set air-fuel ratio is a predetermined air-fuel ratio which is leaner by a certain extent than the stoichiometric air-fuel ratio. For example, it is made 14.65 to 20, preferably 14.68 to 18, more preferably 14.7 to 16 or so.

If the target air-fuel ratio is changed to the lean set air-fuel ratio, the oxygen excess/deficiency of the exhaust gas which flows into the upstream side exhaust purification catalyst 20 is cumulatively added. The "oxygen excess/deficiency" means the oxygen which becomes excessive or the oxygen which becomes deficient (amount of excess unburned gas etc.) when trying to make the air-fuel ratio of the exhaust gas which flows into the upstream side exhaust purification catalyst 20 the stoichiometric air-fuel ratio. In particular, when the target air-fuel ratio is the lean set air-fuel ratio, the exhaust gas which flows into the upstream side exhaust purification catalyst 20 becomes excessive in oxygen. This excess oxygen is stored in the upstream side exhaust purification catalyst 20. Therefore, the cumulative value of the oxygen excess/deficiency (below, also referred to as the "cumulative oxygen excess/deficiency") can be said to express the stored amount of oxygen OSA of the upstream side exhaust purification catalyst 20.

Note that, the oxygen excess/deficiency is calculated based on the output current Irup of the upstream side air-fuel ratio sensor 40 and the estimated value of the intake air amount to the inside of the combustion chamber 5 which is calculated based on the air flow meter 39 etc. or the fuel feed amount of the fuel injector 11 etc. Specifically, the oxygen excess/deficiency OED is, for example, calculated by the following formula (1):

$$ODE = 0.23 \cdot Qi/(AFup14.6) \quad (1)$$

where 0.23 indicates the concentration of oxygen in the air, Qi indicates the amount of fuel injection, and AFup indicates the air-fuel ratio corresponding to the output current Irup of the upstream side air-fuel ratio sensor 40.

If the thus calculated oxygen excess/deficiency becomes the predetermined switching reference value (corresponding to predetermined switching reference storage amount Cref) or more, the target air-fuel ratio which had up to then been the lean set air-fuel ratio is made the rich set air-fuel ratio, then is maintained at this air-fuel ratio. The rich set air-fuel ratio is a predetermined air-fuel ratio which is a certain degree richer than the stoichiometric air-fuel ratio. For example, it is made 12 to 14.58, preferably 13 to 14.57, more preferably 14 to 14.55 or so. Note that, the difference of the rich set air-fuel ratio from the stoichiometric air-fuel ratio (rich degree) is made the difference of the lean set air-fuel ratio from the stoichiometric air-fuel ratio (lean degree) or less. After this, when the output current Irdwn of the downstream side air-fuel ratio sensor 41 again becomes the rich judgment reference value Irrich or less, the target air-fuel ratio is again made the lean set air-fuel ratio. After this, a similar operation is repeated.

In this way, in the present embodiment, the target air-fuel ratio of the exhaust gas which flows into the upstream side exhaust purification catalyst 20 is alternately set to the lean set air-fuel ratio and the rich set air-fuel ratio. In particular, in the present embodiment, the difference of the lean set air-fuel ratio from the stoichiometric air-fuel ratio is made the difference of the rich set air-fuel ratio from the stoichiometric air-fuel ratio or more. Therefore, in the present embodiment, the target air-fuel ratio is alternately set to a short time period lean set air-fuel ratio and a long time period weak rich set air-fuel ratio.

<Explanation of Air Fuel Ratio Control Using Time Chart>

Figure 6:
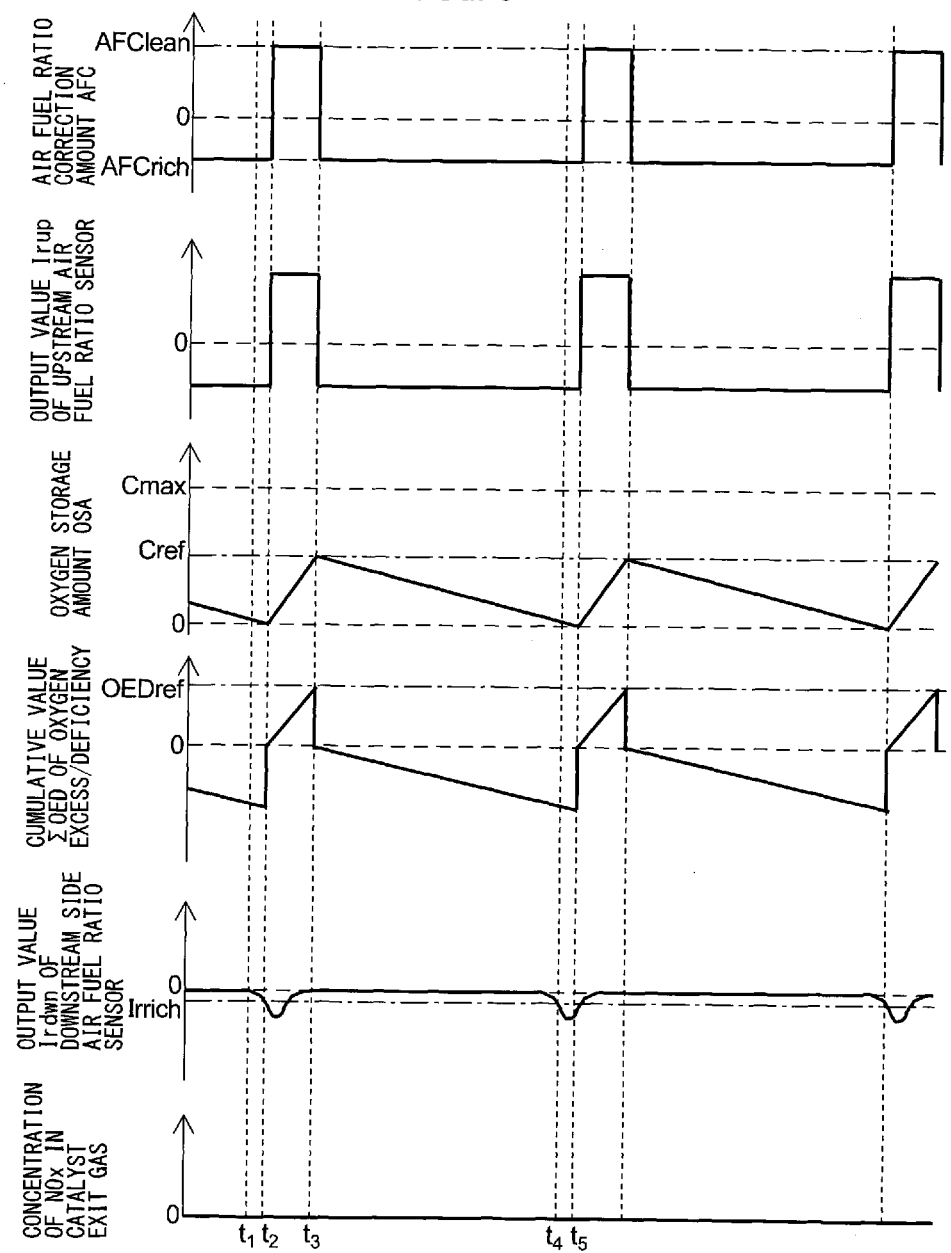
FIG. 6 is a time chart of an air-fuel ratio correction amount etc. relating to the target air-fuel ratio.

Referring to FIG. 6, the above such operation will be explained in detail. FIG. 6 is a time chart of the air-fuel ratio correction amount AFC when performing the air-fuel ratio control of the present embodiment, the output current Irup of the upstream side air-fuel ratio sensor 40, the stored amount of oxygen OSA of the upstream side exhaust purification catalyst 20, the output current Irdwn of the downstream side air-fuel ratio sensor 41, the cumulative oxygen excess/deficiency ΣOED, and the concentration of $NO_x$ in the exhaust gas which flows out from the upstream side exhaust purification catalyst 20.

Note that, the output current Irup of the upstream side air-fuel ratio sensor 40 becomes zero when the air-fuel ratio of the exhaust gas which flows into the upstream side exhaust purification catalyst 20 is the stoichiometric air-fuel ratio. In addition, this becomes a negative value when the air-fuel ratio of the exhaust gas is a rich air-fuel ratio and becomes a positive value when the air-fuel ratio of the exhaust gas is the lean air-fuel ratio. Further, when the air-fuel ratio of the exhaust gas which flows into the upstream side exhaust purification catalyst 20 is the rich air-fuel ratio or lean air-fuel ratio, the larger the difference from the stoichiometric air-fuel ratio, the larger the absolute value of the output current Irup of the upstream side air-fuel ratio sensor 40.

The output current Irdwn of the downstream side air-fuel ratio sensor 41 also changes in accordance with the air-fuel ratio of the exhaust gas which flows out from the upstream side exhaust purification catalyst 20 in the same way as the output current Irup of the upstream side air-fuel ratio sensor 40. Further, the air-fuel ratio correction amount AFC is a correction amount relating to the target air-fuel ratio of the exhaust gas which flows into the upstream side exhaust purification catalyst 20. When the air-fuel ratio correction amount AFC is 0, the target air-fuel ratio is made the stoichiometric air-fuel ratio, when the air-fuel ratio correction amount AFC is a positive value, the target air-fuel ratio becomes a lean air-fuel ratio, and when the air-fuel ratio correction amount AFC is a negative value, the target air-fuel ratio becomes a rich air-fuel ratio.

In the illustrated example, in the state before the time $t_1$, the air-fuel ratio correction amount AFC is made the rich set correction amount AFCrich. The rich set correction amount AFCrich is a value which corresponds to the rich set air-fuel ratio and is a value which is smaller than 0. That is, the target air-fuel ratio is made the rich air-fuel ratio. Along with this, the output current Irup of the upstream side air-fuel ratio sensor 40 becomes a negative value. The exhaust gas which flows into the upstream side exhaust purification catalyst 20 contains unburned gas, so the upstream side exhaust purification catalyst 20 is gradually decreased in the stored amount of oxygen OSA. Further, along with this, the cumulative oxygen excess/deficiency ΣOED is also gradually decreased.

Further, the unburned gas which is contained in the exhaust gas is purified at the upstream side exhaust purification catalyst 20, so the output current Irdwn of the downstream side air-fuel ratio sensor becomes substantially 0 (corresponding to stoichiometric air-fuel ratio). At this time, the air-fuel ratio of the exhaust gas which flows into the upstream side exhaust purification catalyst 20 becomes the rich air-fuel ratio, so the amount of $NO_x$ which is exhausted from the upstream side exhaust purification catalyst 20 becomes substantially zero.

If the upstream side exhaust purification catalyst 20 gradually decreases in stored amount of oxygen OSA, the stored amount of oxygen OSA approaches zero at the time $t_1$. Along with this, part of the unburned gas which flows into the upstream side exhaust purification catalyst 20 starts to flow out without being purified by the upstream side exhaust purification catalyst 20. Due to this, from the time $t_1$ on, the output current Irdwn of the downstream side air-fuel ratio sensor 41 gradually falls. As a result, at the time $t_2$, the output current Irdwn of the downstream side air-fuel ratio sensor 41 reaches the rich judgment reference value Irrich which corresponds to the rich judgment air-fuel ratio.

In the present embodiment, when the output current Irdwn of the downstream side air-fuel ratio sensor 41 becomes the rich judgment reference value Irrich or less, to make the stored amount of oxygen OSA increase, the air-fuel ratio correction amount AFC is switched to the lean set correction amount AFClean. The lean set correction amount AFClean is a value which corresponds to the lean set air-fuel ratio and is a value which is larger than 0. Therefore, the target air-fuel ratio is switched from the rich air-fuel ratio to the lean air-fuel ratio. Further, at this time, the cumulative oxygen excess/deficiency ΣOED is reset to 0.

Note that, in the present embodiment, the air-fuel ratio correction amount AFC is switched after the output current Irdwn of the downstream side air-fuel ratio sensor 41 reaches the rich judgment reference value Irrich, that is, after the air-fuel ratio of the exhaust gas which flows out from the upstream side exhaust purification catalyst 20 reaches the rich judgment air-fuel ratio. This is because even if the stored amount of oxygen of the upstream side exhaust purification catalyst 20 is sufficient, the air-fuel ratio of the exhaust gas which flows out from the upstream side exhaust purification catalyst 20 sometimes ends up being slightly offset from the stoichiometric air-fuel ratio. That is, if the stored amount of oxygen ends up being judged as being substantially zero even if the output current Irdwn is slightly offset from zero (corresponding to stoichiometric air-fuel ratio), there is a possibility that the stored amount of oxygen will be judged to be substantially zero even if there is actually a sufficient stored amount of oxygen. Therefore, in the present embodiment, it is first judged that the stored amount of oxygen is substantially zero when the air-fuel ratio of the exhaust gas which flows out from the upstream side exhaust purification catalyst 20 reaches the rich judgment air-fuel ratio. Conversely speaking, the rich judgment air-fuel ratio is made an air-fuel ratio which the air-fuel ratio of the exhaust gas which flows out from the upstream side exhaust purification catalyst 20 will never reach when the stored amount of oxygen of the upstream side exhaust purification catalyst 20 is sufficient.

At the time $t_2$, when the target air-fuel ratio is switched to the lean air-fuel ratio, the air-fuel ratio of the exhaust gas which flows into the upstream side exhaust purification catalyst 20 changes from the rich air-fuel ratio to the lean air-fuel ratio. Further, along with this, the output current Irup of the upstream side air-fuel ratio sensor 40 becomes a positive value (in actuality, a delay occurs from when the target air-fuel ratio is switched to when the air-fuel ratio of the exhaust gas which flows into the upstream side exhaust purification catalyst 20 changes, but in the illustrated example, it is deemed for convenience that the change is simultaneous). If at the time $t_2$ the air-fuel ratio of the exhaust gas which flows into the upstream side exhaust purification catalyst 20 changes to the lean air-fuel ratio, the upstream side exhaust purification catalyst 20 increases in the stored amount of oxygen OSA. Further, along with this, the cumulative oxygen excess/deficiency ΣOED also gradually increases.

Due to this, the air-fuel ratio of the exhaust gas which flows out from the upstream side exhaust purification catalyst 20 changes to the stoichiometric air-fuel ratio, and the output current Irdwn of the downstream side air-fuel ratio sensor 41 converges to 0. At this time, the air-fuel ratio of the exhaust gas which flows into the upstream side exhaust purification catalyst 20 becomes the lean air-fuel ratio, but there is sufficient leeway in the oxygen storage ability of the upstream side exhaust purification catalyst 20, so the oxygen in the inflowing exhaust gas is stored in the upstream side exhaust purification catalyst 20 and the $NO_x$ is removed by reduction. For this reason, the exhaust of $NO_x$ from the upstream side exhaust purification catalyst 20 becomes substantially zero.

After this, if the upstream side exhaust purification catalyst 20 increases in stored amount of oxygen OSA, at the time $t_3$, the stored amount of oxygen OSA of the upstream side exhaust purification catalyst 20 reaches the switching reference storage amount Cref. For this reason, the cumulative oxygen excess/deficiency ΣOED reaches the switching reference value OEDref which corresponds to the switching reference storage amount Cref. In the present embodiment, if the cumulative oxygen excess/deficiency ΣOED becomes the switching reference value OEDref or more, the storage of oxygen in the upstream side exhaust purification catalyst 20 is suspended by switching the air-fuel ratio correction amount AFC to the rich set correction amount AFCrich (value smaller than 0). Therefore, the target air-fuel ratio is made the rich air-fuel ratio. Further, at this time, the cumulative oxygen excess/deficiency ΣOED is reset to 0.

Here, in the example which is shown in FIG. 6, the stored amount of oxygen OSA falls simultaneously with the target air-fuel ratio being switched at the time $t_3$, but in actuality, a delay occurs from when the target air-fuel ratio is switched to when the stored amount of oxygen OSA falls. As opposed to this, the switching reference storage amount Cref is set sufficiently lower than the maximum storable oxygen amount Cmax. For this reason, even if such a delay occurs, the stored amount of oxygen OSA does not reach the maximum storable oxygen amount Cmax. Conversely, the switching reference storage amount Cref is made an amount sufficiently small so that the stored amount of oxygen OSA does not reach the maximum storable oxygen amount Cmax even if a delay occurs from when the target air-fuel ratio is switched to when the air-fuel ratio of the exhaust gas which flows into the upstream side exhaust purification catalyst 20 actually changes. For example, the switching reference storage amount Cref is made ¾ or less of the maximum storable oxygen amount Cmax when the upstream side exhaust purification catalyst 20 is new, preferably ½ or less, more preferably ⅕ or less.

At the time $t_3$, if the target air-fuel ratio is switched to the rich air-fuel ratio, the air-fuel ratio of the exhaust gas which flows into the upstream side exhaust purification catalyst 20 changes from the lean air-fuel ratio to the rich air-fuel ratio. Along with this, the output current Irup of the upstream side air-fuel ratio sensor 40 becomes a negative value (in actuality, a delay occurs from when the target air-fuel ratio is switched to when the exhaust gas which flows into the upstream side exhaust purification catalyst 20 changes in air-fuel ratio, but in the illustrated example, it is deemed for convenience that the change is simultaneous). The exhaust gas which flows into the upstream side exhaust purification catalyst 20 contains unburned gas, so the upstream side exhaust purification catalyst 20 gradually decreases in stored amount of oxygen OSA. At the time $t_4$, in the same way as the time $t_1$, the output current Irdwn of the downstream side air-fuel ratio sensor 41 starts to fall. At this time as well, the air-fuel ratio of the exhaust gas which flows into the upstream side exhaust purification catalyst 20 is the rich air-fuel ratio, so substantially zero $NO_x$ is exhausted from the upstream side exhaust purification catalyst 20.

Next, at the time $t_5$, in the same way as time $t_2$, the output current Irdwn of the downstream side air-fuel ratio sensor 41 reaches the rich judgment reference value Irrich which corresponds to the rich judgment air-fuel ratio. Due to this, the air-fuel ratio correction amount AFC is switched to the value AFClean which corresponds to the lean set air-fuel ratio. After this, the cycle of the above mentioned times $t_1$ to $t_5$ is repeated.

As will be understood from the above explanation, according to the present embodiment, it is possible to constantly suppress the amount of $NO_x$ which is exhausted from the upstream side exhaust purification catalyst 20. That is, so long as performing the above mentioned control, basically it is possible to reduce the amount of $NO_x$ which is exhausted from the upstream side exhaust purification catalyst 20.

Further, in the above embodiment, the cumulative oxygen excess/deficiency $\Sigma$OED is calculated, that is, the stored amount of oxygen OSA of the upstream side exhaust purification catalyst 20 is estimated, based on the output current Irup of the upstream side air-fuel ratio sensor 40 and the estimated value of the intake air amount etc. However, when calculating the cumulative oxygen excess/deficiency $\Sigma$OED in this way, there is a possibility of error occurring. In the present embodiment as well, the stored amount of oxygen OSA is estimated from the time $t_2$ to $t_3$, so the estimated value of the stored amount of oxygen OSA includes some error. However, in the present embodiment, the switching reference storage amount Cref which corresponds to the switching reference value OEDref is set sufficiently lower than the maximum storable oxygen amount Cmax. For this reason, even if the above-mentioned error is included, so long as the upstream side exhaust purification catalyst 20 does not greatly deteriorate, the actual stored amount of oxygen OSA almost never reaches the maximum storable oxygen amount Cmax. Therefore, from this viewpoint as well, it is possible to suppress the exhaust of $NO_x$ from the upstream side exhaust purification catalyst 20.

Further, in general, if the stored amount of oxygen of the exhaust purification catalyst is maintained constant, the exhaust purification catalyst falls in oxygen storage ability. That is, to maintain the exhaust purification catalyst high in oxygen storage ability, the stored amount of oxygen of the exhaust purification catalyst has to fluctuate. As opposed to this, according to the present embodiment, as shown in FIG. 6, the stored amount of oxygen OSA of the upstream side exhaust purification catalyst 20 constantly fluctuates up and down, so the oxygen storage ability is kept from falling.

Note that, in the above embodiment, at the times $t_2$ to $t_3$, the air-fuel ratio correction amount AFC is maintained at the lean set correction amount AFClean. However, at this time period, the air-fuel ratio correction amount AFC does not necessarily have to be maintained constant. It may be set to gradually decrease or otherwise fluctuate. Alternatively, in the time period of the times $t_2$ to $t_3$, it is also possible to temporarily make the air-fuel ratio correction amount AFC a value smaller than 0 (for example, the rich set correction amount etc.) That is, in the time period of the times $t_2$ to $t_3$, the target air-fuel ratio may also temporarily be made the rich air-fuel ratio.

Figure 7:
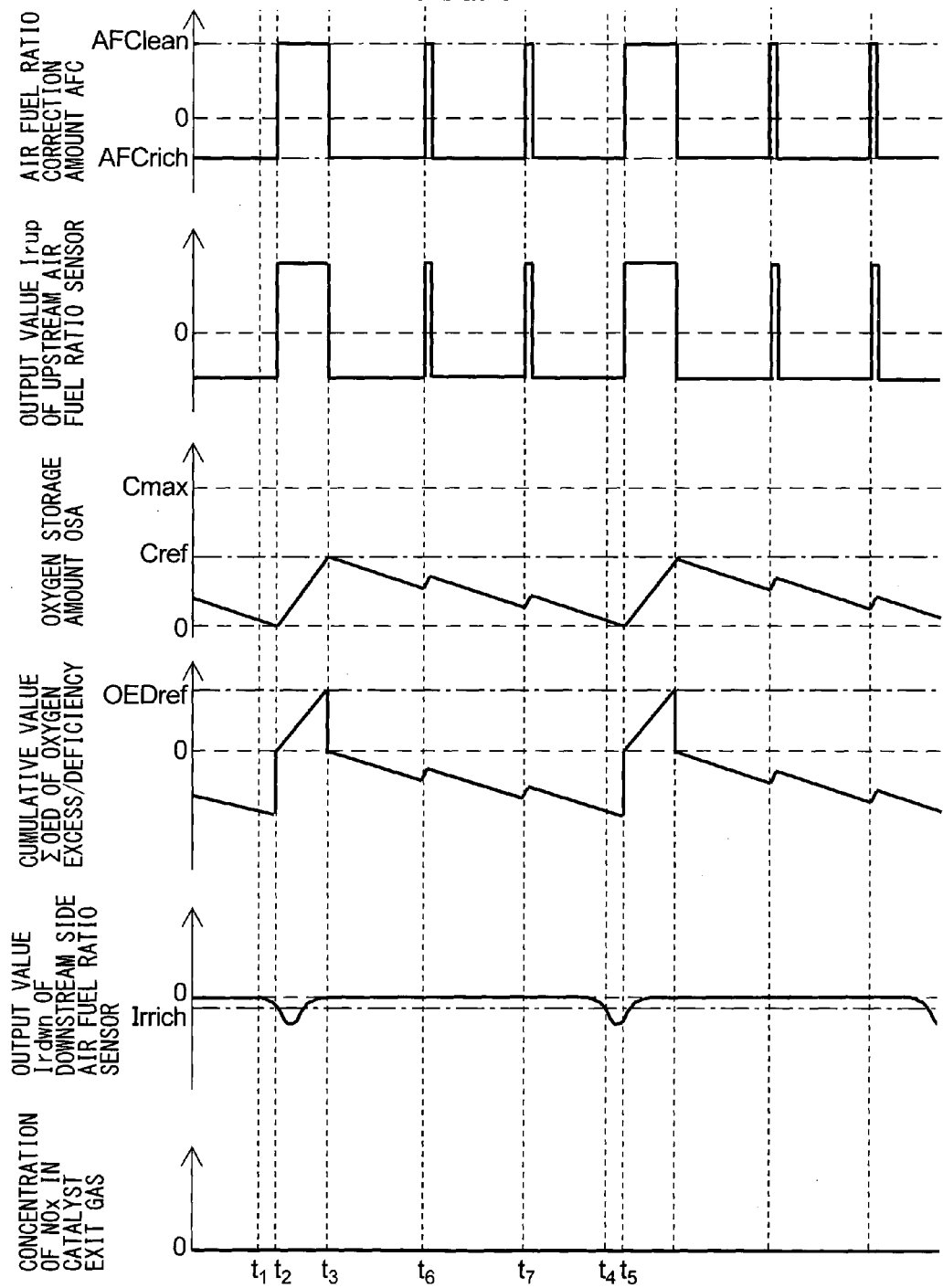
FIG. 7 is a time chart of an air-fuel ratio correction amount etc. relating to the target air-fuel ratio.

Similarly, in the above embodiment, at the times $t_3$ to $t_5$, the air-fuel ratio correction amount AFC is maintained at the rich set correction amount AFCrich. However, at this time period, the air-fuel ratio correction amount AFC does not necessarily have to be maintained constant. It may be set to gradually increase or otherwise fluctuate. Alternatively, as shown in FIG. 7, in the time period of the times $t_3$ to $t_5$, it is also possible to temporarily make the air-fuel ratio correction amount AFC a value larger than 0 (for example, the lean set correction amount etc.) (FIG. 7, times $t_6$, $t_7$, etc.) That is, in the time period of the times $t_3$ to $t_5$, the target air-fuel ratio may also temporarily be made the lean air-fuel ratio.

However, in this case as well, the air-fuel ratio correction amount AFC at the times $t_2$ to $t_3$ is set so that the difference between the average value of the target air-fuel ratio and the stoichiometric air-fuel ratio becomes larger than the difference between the average value of the target air-fuel ratio and the stoichiometric air-fuel ratio at the times $t_3$ to $t_5$.

Note that, in the present embodiment, the air-fuel ratio correction amount AFC is set, that is, the target air-fuel ratio is set, by the ECU 31. Therefore, the ECU 31 can be said to make the target air-fuel ratio of the exhaust gas which flows into the upstream side exhaust purification catalyst 20 the lean air-fuel ratio continuously or intermittently until the stored amount of oxygen OSA of the upstream side exhaust purification catalyst 20 becomes the switching reference storage amount Cref when the air-fuel ratio of the exhaust gas which is detected by the downstream side air-fuel ratio sensor 41 becomes the rich judgment air-fuel ratio or less and to make the target air-fuel ratio the rich air-fuel ratio continuously or intermittently until the air-fuel ratio of the exhaust gas which is detected by the downstream side air-fuel ratio sensor 41 becomes the rich judgment air-fuel ratio or less without the stored amount of oxygen OSA reaching the maximum storable oxygen amount Cmaxn when the stored amount of oxygen OSA of the upstream side exhaust purification catalyst 20 becomes the switching reference storage amount Cref or more.

More simply speaking, in the present embodiment, the ECU 31 can be said to switch the target air-fuel ratio to the lean air-fuel ratio when the air-fuel ratio which is detected by the downstream side air-fuel ratio sensor 41 becomes the rich judgment air-fuel ratio or less and to switch the target air-fuel ratio to the rich air-fuel ratio when the stored amount of oxygen OSA of the upstream side exhaust purification catalyst 20 becomes the switching reference storage amount Cref or more.

Further, in the above embodiment, the cumulative oxygen excess/deficiency $\Sigma$OED is calculated based on the output current Irup of the upstream side air-fuel ratio sensor 40 and the estimated value of the amount of intake air taken into the combustion chamber 5 etc. However, the stored amount of oxygen OSA may also be calculated based on parameters other than these parameters and may be estimated based on parameters which are different from these parameters. Further, in the above embodiment, if the cumulative oxygen excess/deficiency ΣOED becomes the switching reference value OEDref or more, the target air-fuel ratio is switched from the lean set air-fuel ratio to the rich set air-fuel ratio. However, the timing of switching the target air-fuel ratio from the lean set air-fuel ratio to the rich set air-fuel ratio may, for example, also be based on the engine operating time from when switching the target air-fuel ratio from the rich set air-fuel ratio to the lean set air-fuel ratio or other parameter. However, in this case as well, the target air-fuel ratio has to be switched from the lean set air-fuel ratio to the rich set air-fuel ratio while the stored amount of oxygen OSA of the upstream side exhaust purification catalyst 20 is estimated to be smaller than the maximum storable oxygen amount.

<Effects of Offset at Upstream Side Air Fuel Ratio Sensor>

In this regard, when the engine body 1 has a plurality of cylinders, sometimes an offset occurs between the cylinders in the air-fuel ratio of the exhaust gas which is exhausted from the cylinders. On the other hand, the upstream side air-fuel ratio sensor 40 is arranged at the header of the exhaust manifold 19, but depending on the position of arrangement, the extent by which the exhaust gas which is exhausted from each cylinder is exposed to the upstream side air-fuel ratio sensor 40 differs between cylinders. As a result, the air-fuel ratio which is detected by the upstream side air-fuel ratio sensor 40 is strongly affected by the air-fuel ratio of the exhaust gas which is exhausted from a certain specific cylinder. For this reason, when the air-fuel ratio of the exhaust gas which is exhausted from a certain specific cylinder becomes an air-fuel ratio which differs from the average air-fuel ratio of the exhaust gas which is exhausted from all cylinders, offset occurs between the average air-fuel ratio and the air-fuel ratio which is detected by the upstream side air-fuel ratio sensor 40. That is, the air-fuel ratio which is detected by the upstream side air-fuel ratio sensor 40 becomes offset to the rich side or lean side from the average air-fuel ratio of the actual exhaust gas.

Further, hydrogen has a fast speed of passage through the diffusion regulation layer of the air-fuel ratio sensor. For this reason, if the concentration of hydrogen in the exhaust gas is high, the air-fuel ratio which is detected by the upstream side air-fuel ratio sensor 40 ends up being offset to the lower side than the actual air-fuel ratio of the exhaust gas (that is, the rich side).

If offset occurs in the output value of the upstream side air-fuel ratio sensor 40 in this way, even if the above mentioned control is performed, sometimes $NO_x$ and oxygen end up flowing out from the upstream side exhaust purification catalyst 20. Below, this phenomenon will be explained with reference to FIG. 8.

Figure 8:
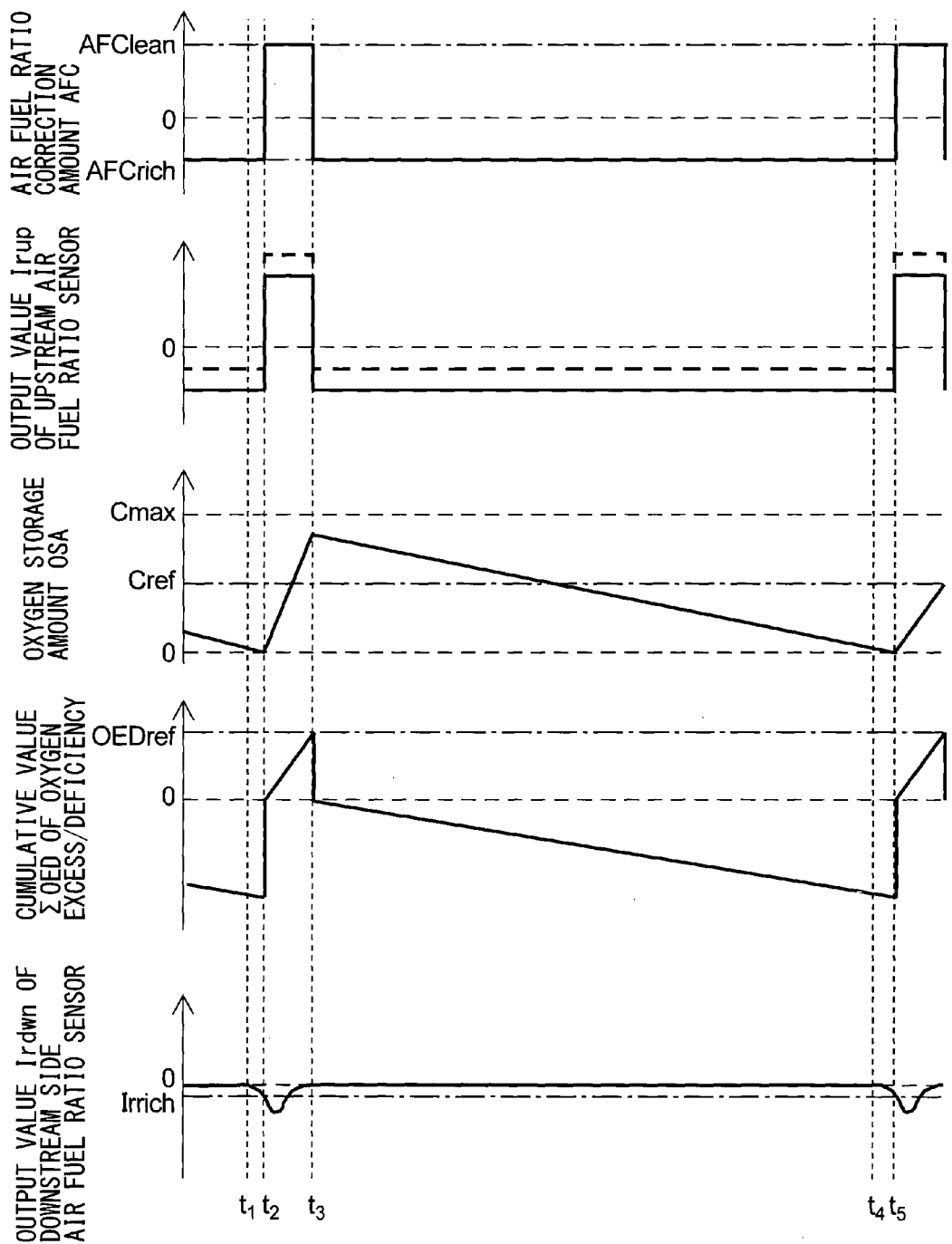
FIG. 8 is a time chart of an air-fuel ratio correction amount etc. relating to the target air-fuel ratio.

FIG. 8 is a time chart of the stored amount of oxygen OSA of the upstream side exhaust purification catalyst 20 etc. similar to FIG. 6. FIG. 8 shows the case where the output current of the upstream side air-fuel ratio sensor 40 is offset to the rich side. In the figure, the solid line in the output current Irup of the upstream side air-fuel ratio sensor 40 shows the actual output current. On the other hand, the broken line shows the output current in the case where it is assumed no offset has occurred in the upstream side air-fuel ratio sensor 40. That is, the broken line corresponds to the output current of the upstream side air-fuel ratio sensor 40 which corresponds to the actual air-fuel ratio of the exhaust gas which flows into the upstream side exhaust purification catalyst 20.

In the example which is shown in FIG. 8 as well, in the state before the time $t_1$, the air-fuel ratio correction amount AFC is made the rich set correction amount AFCrich and therefore the target air-fuel ratio is made the rich set air-fuel ratio. Further, as explained above, in the present embodiment, the output current Irup of the upstream side air-fuel ratio sensor 40 is made to become a value corresponding to the target air-fuel ratio by feedback control. For this reason, the output current Irup of the upstream side air-fuel ratio sensor 40 becomes a negative value which corresponds to the rich set air-fuel ratio. However, as explained above, the output current of the upstream side air-fuel ratio sensor 40 is offset to the rich side, so the actual air-fuel ratio of the exhaust gas becomes an air-fuel ratio which is leaner than the rich set air-fuel ratio. That is, the output current Irup of the upstream side air-fuel ratio sensor 40 becomes lower than the value which corresponds to the actual air-fuel ratio (broken line in the figure) (rich side).

In this way, due to the offset of the output current of the upstream side air-fuel ratio sensor 40, the actual air-fuel ratio of the exhaust gas becomes an air-fuel ratio with a smaller rich degree than the rich set air-fuel ratio. For this reason, the speed of decrease of the stored amount of oxygen OSA of the upstream side exhaust purification catalyst 20 becomes slow. Further, if the upstream side air-fuel ratio sensor 40 is large in offset of output current, even if making the target air-fuel ratio the rich set air-fuel ratio, sometimes the actual air-fuel ratio of the exhaust gas becomes a lean air-fuel ratio. In this case, the stored amount of oxygen OSA of the upstream side exhaust purification catalyst 20 rather increases. Therefore, in this case, the stored amount of oxygen OSA of the upstream side exhaust purification catalyst 20 reaches the maximum storable oxygen amount Cmax, and $NO_x$ and oxygen flow out from the upstream side exhaust purification catalyst 20.

Further, in the example which is shown in FIG. 8, at the time $t_2$, the output current Irdwn of the downstream side air-fuel ratio sensor 41 reaches the rich judgment reference value Irrich. For this reason, as explained above, at the time $t_2$, the air-fuel ratio correction amount AFC is switched to the lean set correction amount AFClean. That is, the target air-fuel ratio is switched to the lean set air-fuel ratio.

Along with this, the output current Irup of the upstream side air-fuel ratio sensor 40 becomes a negative value corresponding to the lean set air-fuel ratio. However, as explained above, the output current of the upstream side air-fuel ratio sensor 40 is offset to the rich side, so the actual air-fuel ratio of the exhaust gas becomes an air-fuel ratio leaner than the lean set air-fuel ratio. That is, the output current Irup of the upstream side air-fuel ratio sensor 40 becomes lower (rich side) than a value corresponding to the actual air-fuel ratio (broken line in figure).

Figure 9:
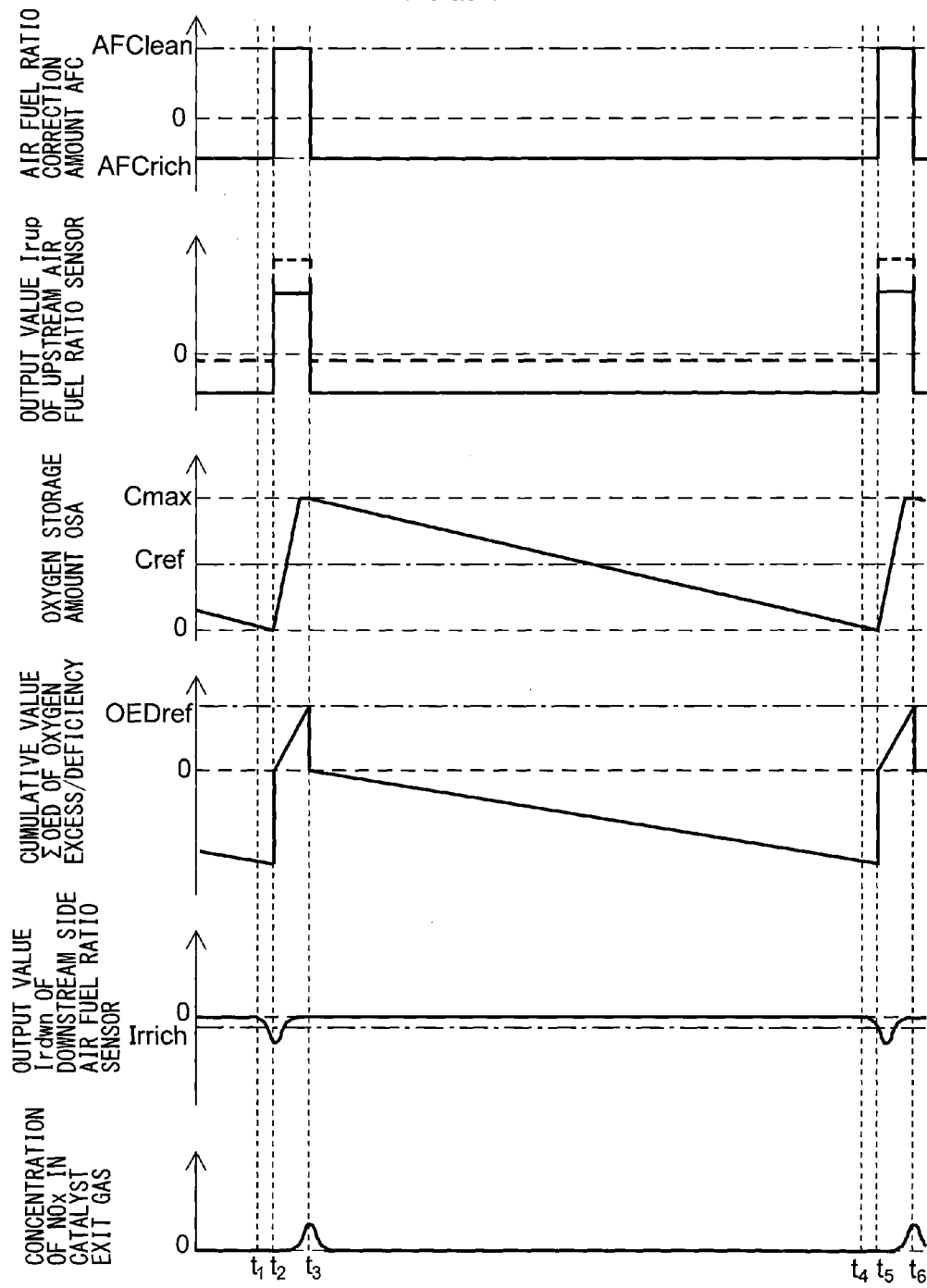
FIG. 9 is a time chart of an air-fuel ratio correction amount etc. relating to the target air-fuel ratio.

In this way, due to the offset of the output current of the upstream side air-fuel ratio sensor 40, the actual air-fuel ratio of the exhaust gas becomes an air-fuel ratio which is larger in lean degree than the lean set air-fuel ratio. For this reason, the speed of increase of the stored amount of oxygen OSA of the upstream side exhaust purification catalyst 20 becomes faster. In addition, if the upstream side air-fuel ratio sensor 40 becomes large in offset of output current, the speed of increase of the stored amount of oxygen OSA of the upstream side exhaust purification catalyst 2 becomes extremely fast. Therefore, in this case, as shown in FIG. 9, before the cumulative value ΣOED of the oxygen excess/deficiency which was calculated based on the output current Irup of the upstream side air-fuel ratio sensor 40 reaches the switching reference value OEDref, the actual stored amount of oxygen OSA reaches the maximum storable oxygen amount Cmax. As a result, $NO_x$ and oxygen flow out from the upstream side exhaust purification catalyst 20.

In this way, if the upstream side air-fuel ratio sensor 40 becomes greatly offset in output current, $NO_x$ and oxygen flow out from the upstream side exhaust purification catalyst 20. In addition, even if the offset which occurs in the output current of the upstream side air-fuel ratio sensor 30 is not that large, sometimes the cycle from the times $t_2$ to $t_5$ which is shown in FIG. 6 and FIG. 8 becomes extremely short. In this case, the amount of fluctuation of the stored amount of oxygen OSA is small, so a fall in the oxygen storage ability of the upstream side exhaust purification catalyst 20 is invited. Further, at the time $t_3$, the stored amount of oxygen OSA becomes greater than the switching reference storage amount Cref, so deterioration of the upstream side exhaust purification catalyst 20 etc. causes $NO_x$ to more easily flow out from the upstream side exhaust purification catalyst 20. For this reason, it becomes necessary to detect the offset in the output current of the upstream side air-fuel ratio sensor 40 and becomes necessary to use the detected offset to correct the output current etc.

<Learning Control>

Therefore, in an embodiment of the present invention, learning control is performed during normal operation to compensate for offset in the output current of the upstream side air-fuel ratio sensor 40 (that is, when using the above mentioned target air-fuel ratio as the basis to perform feedback control). Here, the time period from when switching the target air-fuel ratio to the lean air-fuel ratio to when the cumulative oxygen excess/deficiency ΣOED becomes the switching reference value OEDref or more is made the oxygen increase time period (first time period). Similarly, the time period from when the target air-fuel ratio is switched to the rich air-fuel ratio to when the air-fuel ratio which is detected by the downstream side air-fuel ratio sensor 41 becomes the rich judgment air-fuel ratio or less is made the oxygen decrease time period (second time period). In the learning control of the present embodiment, as the absolute value of the cumulative oxygen excess/deficiency LODE in the oxygen increase time period, the lean cumulative value of amount of oxygen (first cumulative value of amount of oxygen) is calculated. In addition, as the absolute value of the cumulative oxygen excess/deficiency in the oxygen decrease time period, the rich cumulative value of amount of oxygen (second cumulative value of amount of oxygen) is calculated. Further, the difference between the lean cumulative value of amount of oxygen and rich cumulative value of amount of oxygen is made to become smaller by correction of the air-fuel ratio correction amount AFC. Below, this state will be explained with reference to FIG. 10.

Figure 10:
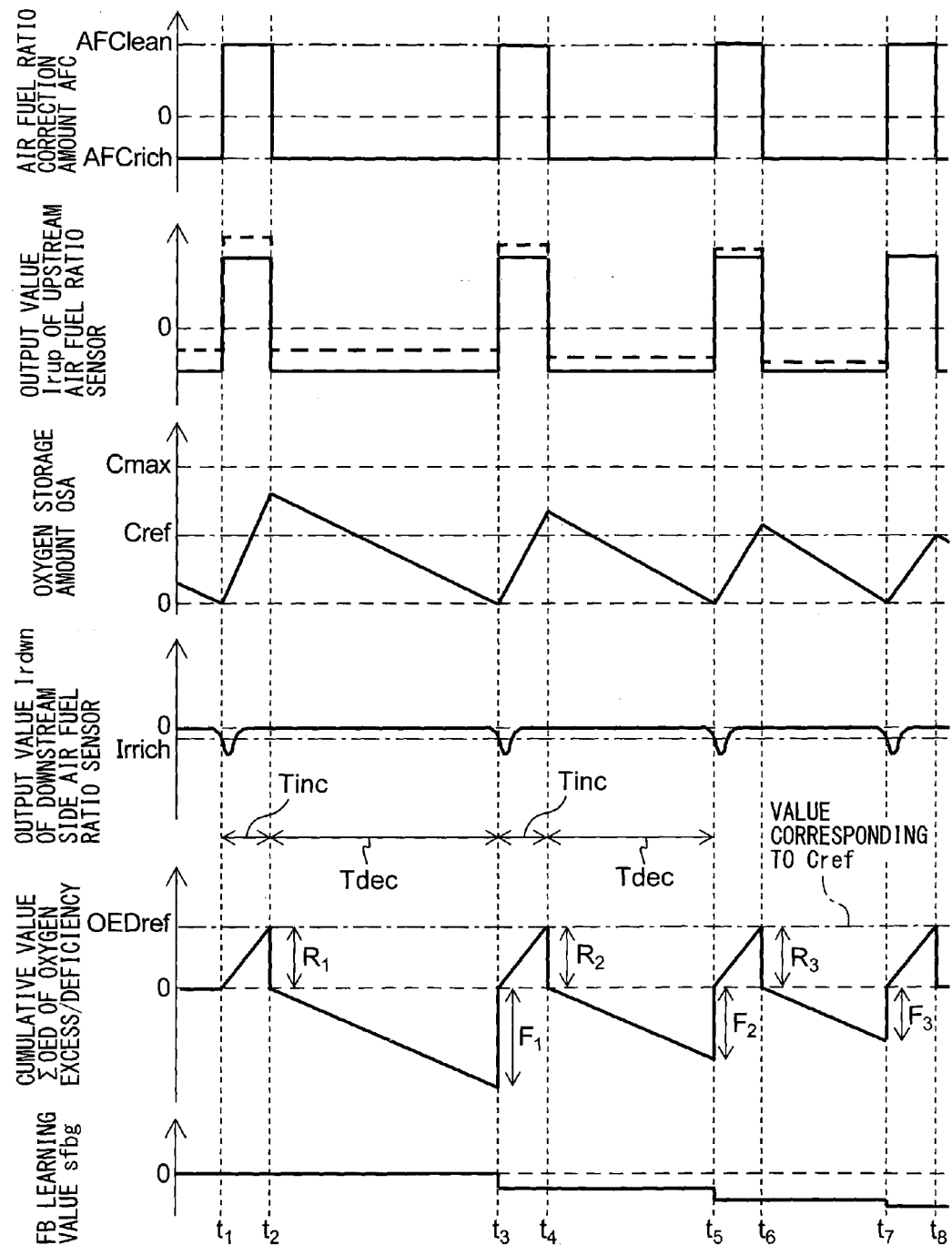
FIG. 10 is a time chart of an air-fuel ratio correction amount etc. relating to the target air-fuel ratio.

FIG. 10 is a time chart of the air-fuel ratio correction amount AFC, the output current Irup of the upstream side air-fuel ratio sensor 40, the stored amount of oxygen OSA of the upstream side exhaust purification catalyst 20, the output current Irdwn of the downstream side air-fuel ratio sensor 41, the cumulative oxygen excess/deficiency ΣOED, and the learning value sfbg. FIG. 10 shows the case, like FIG. 8, where the output current Irup of the upstream side air-fuel ratio sensor 40 is offset to the low side (rich side). Note that, the learning value sfbg is a value which changes in accordance with the offset of the output current of the upstream side air-fuel ratio sensor 40 and is used for correction of the output current of the upstream side air-fuel ratio sensor 40.

In the illustrated example, in the same way as FIG. 6 and FIG. 8, in the state before the time $t_1$, the air-fuel ratio correction amount AFC is made the rich set correction amount AFCrich and therefore the target air-fuel ratio is made the rich air-fuel ratio. At this time, the output current Irup of the upstream side air-fuel ratio sensor 40, as shown by the solid line, becomes a negative value which corresponds to the rich set air-fuel ratio. However, the output current of the upstream side air-fuel ratio sensor 40 is offset to the lower side from the value corresponding to the actual air-fuel ratio (that is, the rich side). For this reason, the actual air-fuel ratio of the exhaust gas becomes an air-fuel ratio which is leaner than the rich set air-fuel ratio. However, in the example which is shown in FIG. 10, as will be understood from the broken line of FIG. 10, the actual exhaust gas before the time $t_1$ becomes a rich air-fuel ratio which is leaner than the rich set air-fuel ratio while is richer than the stoichiometric air-fuel ratio. Therefore, the upstream side exhaust purification catalyst 20 is gradually decreased in the stored amount of oxygen.

At the time $t_1$, the output current Irdwn of the downstream side air-fuel ratio sensor 41 reaches the rich judgment reference value Irrich. Due to this, as explained above, the air-fuel ratio correction amount AFC is switched to the lean set correction amount AFClean. At the time $t_1$ on, the output current of the upstream side air-fuel ratio sensor 40 becomes a positive value which corresponds to the lean set air-fuel ratio. However, due to offset of the output current of the upstream side air-fuel ratio sensor 40, the actual air-fuel ratio of the exhaust gas becomes an air-fuel ratio which is leaner than the lean set air-fuel ratio, that is, an air-fuel ratio with a lean degree (see broken line of FIG. 10). For this reason, the stored amount of oxygen OSA the upstream side exhaust purification catalyst 20 rapidly increases.

On the other hand, the oxygen excess/deficiency is calculated based on the output current Irup of the upstream side air-fuel ratio sensor 40. However, as explained above, offset occurs in the output current Irup of the upstream side air-fuel ratio sensor 40. Therefore, the calculated oxygen excess/deficiency becomes a value smaller than the actual oxygen excess/deficiency (that is, smaller in amount of oxygen). As a result, the calculated cumulative oxygen excess/deficiency ΣOED becomes smaller than the actual value.

At the time $t_2$, the cumulative oxygen excess/deficiency ΣOED reaches the switching reference value OEDref. For this reason, the air-fuel ratio correction amount AFC is switched to the rich set correction amount AFCrich. Therefore, the target air-fuel ratio is made the rich air-fuel ratio. At this time, the actual stored amount of oxygen OSA, as shown in FIG. 10, becomes greater than the switching reference storage amount Cref.

At the time $t_2$ on, in the same way as the state before the time $t_1$, the air-fuel ratio correction amount AFC is made the rich set correction amount AFCrich and accordingly the target air-fuel ratio is made the rich air-fuel ratio. At this time as well, the actual air-fuel ratio of the exhaust gas becomes an air-fuel ratio which is leaner than the rich set air-fuel ratio. As a result, the upstream side exhaust purification catalyst 20 becomes slower in speed of decrease of the stored amount of oxygen OSA. In addition, as explained above, at the time $t_2$, the actual stored amount of oxygen of the upstream side exhaust purification catalyst 20 becomes greater than the switching reference storage amount Cref. For this reason, time is taken until the actual stored amount of oxygen of the upstream side exhaust purification catalyst 20 reaches zero.

At the time $t_3$, the output current Irdwn of the downstream side air-fuel ratio sensor 41 reaches the rich judgment reference value Irrich. Due to this, as explained above, the air-fuel ratio correction amount AFC is switched to the lean set correction amount AFClean. Therefore, the target air-fuel ratio is switched from the rich set air-fuel ratio to the lean set air-fuel ratio.

Here, in the present embodiment, as explained above, the cumulative oxygen excess/deficiency ΣOED is calculated from the time $t_1$ to the time $t_2$. Here, if referring to the time period from when the target air-fuel ratio is switched to the lean air-fuel ratio (time $t_1$) to when the estimated value of the stored amount of oxygen OSA of the upstream side exhaust purification catalyst 20 becomes the switching reference storage amount Cref or more (time $t_2$) as the "oxygen increase time period Tinc", in the present embodiment, the cumulative oxygen excess/deficiency ΣOED is calculated in the oxygen increase time period Tinc. In FIG. 10, the absolute value of the cumulative oxygen excess/deficiency ΣOED in the oxygen increase time period Tinc from the time $t_1$ to time $t_2$ is shown as $R_1$.

The cumulative oxygen excess/deficiency ΣOED($R_1$) of this oxygen increase time period Tinc corresponds to the stored amount of oxygen OSA at the time $t_2$. However, as explained above, estimation of the oxygen excess/deficiency uses the output current Irup of the upstream side air-fuel ratio sensor 40. Offset occurs in this output current Irup. For this reason, in the example which is shown in FIG. 10, the cumulative oxygen excess/deficiency ΣOED in the oxygen increase time period Tinc from the time $t_1$ to time $t_2$ becomes smaller than the value which corresponds to the stored amount of oxygen OSA at the time $t_2$.

Further, in the present embodiment, the cumulative oxygen excess/deficiency ΣOED is calculated even from the time $t_2$ to time $t_3$. Here, if referring to the time period from when the target air-fuel ratio is switched to the rich air-fuel ratio (time $t_2$) to when the output current Irdwn of the downstream side air-fuel ratio sensor 41 reaches the rich judgment reference value Irrich (time $t_3$) as the "oxygen decrease time period Tdec", in the present embodiment, the cumulative oxygen excess/deficiency ΣOED is calculated in the oxygen decrease time period Tdec. In FIG. 10, the absolute value of the cumulative oxygen excess/deficiency ΣOED at the oxygen decrease time period Tdec at the time $t_2$ to time $t_3$ is shown as $F_1$.

The cumulative oxygen excess/deficiency ΣOED($F_1$) of this oxygen decrease time period Tdec corresponds to the total amount of oxygen which is released from the upstream side exhaust purification catalyst 20 from the time $t_2$ to the time $t_3$. However, as explained above, offset occurs in the output current Irup of the upstream side air-fuel ratio sensor 40. For this reason, in the example which is shown in FIG. 10, the cumulative oxygen excess/deficiency ΣOED in the oxygen decrease time period Tdec of the time $t_2$ to time $t_3$ is smaller than the value which corresponds to the total amount of oxygen which is released from the upstream side exhaust purification catalyst 20 from the time $t_2$ to the time $t_3$.

In this regard, in the oxygen increase time period Tinc, oxygen is stored at the upstream side exhaust purification catalyst 20, while in the oxygen decrease time period Tdec, the stored oxygen is completely released. Therefore, ideally the absolute value $R_1$ of the cumulative oxygen excess/deficiency at the oxygen increase time period Tinc and the absolute value $F_1$ of the cumulative oxygen excess/deficiency at the oxygen decrease time period Tdec basically become the same value. In this regard, as explained above, when offset occurs in the output current Irup of the upstream side air-fuel ratio sensor 40, the value of the cumulative value changes in accordance with the offset. As explained above, when the output current of the upstream side air-fuel ratio sensor 40 is offset to the low side (rich side), the absolute value $F_1$ becomes greater than the absolute value $R_1$. Conversely, when the output current of the upstream side air-fuel ratio sensor 40 is offset to the high side (lean side), the absolute value $F_1$ becomes smaller compared with the absolute value $R_1$. In addition, the difference ΔΣOED of the absolute value $R_1$ of the cumulative oxygen excess/deficiency at the oxygen increase time period Tinc and the absolute value $F_1$ of the cumulative oxygen excess/deficiency at the oxygen decrease time period Tdec (=$R_1$ $F_1$. below, also referred to as the "excess/deficiency error") expresses the extent of offset at the output current of the upstream side air-fuel ratio sensor 40. The larger the difference of these absolute values $R_1$ and $F_1$, the greater the offset in the output current of the upstream side air-fuel ratio sensor 40.

Therefore, in the present embodiment, the excess/deficiency error ΔΣOED is used as the basis to correct the air-fuel ratio correction amount AFC. In particular, in the present embodiment, the difference ΔΣOED of the absolute value $R_1$ of the cumulative oxygen excess/deficiency at the oxygen increase time period Tinc and the absolute value $F_1$ of the cumulative oxygen excess/deficiency at the oxygen decrease time period Tdec becomes smaller by correction of the air-fuel ratio correction amount AFC.

Specifically, in the present embodiment, the following formula (2) is used to calculate the learning value sfbg, while the following formula (3) is used to correct the air-fuel ratio correction amount AFC.

$$sfbg(n)=sfbg(n1)+k \cdot \Delta OED \quad (2)$$

$$AFC=AFCbase+sfbg(n) \quad (3)$$

Note that, in the above formula (2), "n" expresses the number of calculations or time. Therefore, sfbg(n) is the current calculated or current learning value. In addition, "k" in the above formula (2) is the gain which shows the extent by which the excess/deficiency error ΔOED is reflected in the air-fuel ratio correction amount AFC. The larger the value of the gain "k", the larger the correction amount of the air-fuel ratio correction amount AFC. In addition, in the above formula (3), the base air-fuel ratio correction amount AFCbase is a correction amount which is determined based on the above mentioned control for setting the target air-fuel ratio. Note that, the air-fuel ratio correction amount AFC in FIG. 10 actually shows the base air-fuel ratio correction amount AFCbase.

At the time $t_3$ of FIG. 10, as explained above, the absolute values $R_1$ and $F_1$ are used as the basis to calculate the learning value sfbg. In particular, in the example which is shown in FIG. 10, the absolute value $F_1$ of the cumulative oxygen excess/deficiency at the oxygen decrease time period Tdec is larger than the absolute value $R_1$ of the cumulative oxygen excess/deficiency at the oxygen increase time period Tinc, so at the time $t_3$, the learning value sfbg is decreased.

Here, in the present embodiment, the air-fuel ratio correction amount AFC is corrected based on the learning value sfbg. Specifically, the base air-fuel ratio correction amount AFCbase plus the learning value sfbg is treated as the air-fuel ratio correction amount AFC. In the example which is shown in FIG. 10, the learning value sfbg is a negative value, so the air-fuel ratio correction amount AFC becomes a value smaller than the base air-fuel ratio correction amount AFCbase, that is, the rich side value. Due to this, the exhaust gas which flows into the upstream side exhaust purification catalyst 20 is corrected in air-fuel ratio to the rich side.

As a result, the offset of the output current Irup of the upstream side air-fuel ratio sensor 40 with respect to the value corresponding to the air-fuel ratio of the actual exhaust gas at the time $t_3$ on becomes smaller than before the time $t_3$. Therefore, the difference between the solid line and broken line at the output current Irup from the time $t_3$ on becomes smaller than the difference before the time $t_3$.

Further, at the time $t_3$ on as well, an operation similar to the operation at the time $t_1$ to time $t_2$ is performed. Therefore, at the time $t_4$, if the cumulative oxygen excess/deficiency ΣOED reaches the switching reference value OEDref, the target air-fuel ratio is switched from the lean set air-fuel ratio to the rich set air-fuel ratio. After this, at the time $t_5$, when the output current Irdwn of the downstream side air-fuel ratio sensor 41 reaches the rich judgment reference value Irrich, the target air-fuel ratio is again switched to the lean set air-fuel ratio.

The time $t_3$ to time $t_4$, as explained above, corresponds to the oxygen increase time period Tinc. Therefore, the absolute value of the cumulative oxygen excess/deficiency ΣOED during this is expressed by $R_2$ of FIG. 10. Further, the time $t_4$ to time $t_5$, as explained above, corresponds to the oxygen decrease time period Tdec, therefore the absolute value of the cumulative oxygen excess/deficiency ΣOED during this is expressed by $F_2$ of FIG. 10. Further, the difference $\Delta OED(=R_2, F_2)$ of these absolute values $R_2$ and $F_2$ is used as the basis to update the learning value sfbg using the above formula (1). In the present embodiment, similar control is repeated at the time $t_5$ on and, due to this, the learning value sfbg is repeatedly updated.

By updating the learning value sfbg in this way, the output current Irup of the upstream side air-fuel ratio sensor 40 gradually approaches the output current which corresponds to the actual air-fuel ratio. Due to this, it is possible to gradually reduce the offset at the output current of the upstream side air-fuel ratio sensor 40.

Further, in the above embodiment, the target air-fuel ratio is switched before the stored amount of oxygen OSA of the upstream side exhaust purification catalyst 20 reaches the maximum storable oxygen amount Cmax. For this reason, compared with the case of switching the target air-fuel ratio after the stored amount of oxygen OSA reaches the maximum storable oxygen amount, that is, after the output current Irdwn of the downstream side air-fuel ratio sensor 41 becomes a lean judgment air-fuel ratio which is leaner than the stoichiometric air-fuel ratio or more, the frequency of update of the learning value can be lowered. Further, the cumulative oxygen excess/deficiency ΣOED easily suffers from error the longer this calculation time period. According to the present embodiment, the target air-fuel ratio is switched before the stored amount of oxygen OSA reaches the maximum storable oxygen amount, so the calculation time period can be shortened. For this reason, the error in calculation of the cumulative oxygen excess/deficiency ΣOED can be reduced.

Note that, as explained above, the learning value sfbg is preferably updated based on the cumulative oxygen excess/deficiency ΣOED at the oxygen increase time period Tinc and the cumulative oxygen excess/deficiency ΣOED at the oxygen decrease time period Tdec right after this oxygen increase time period Tinc. This is because, as explained above, the total amount of oxygen which is stored at the upstream side exhaust purification catalyst 20 in the oxygen increase time period Tinc and the total amount of oxygen which is released from the upstream side exhaust purification catalyst 20 in the directly following oxygen decrease time period Tdec become equal.

In addition, in the above embodiment, the cumulative oxygen excess/deficiency ΣOED in a single oxygen increase time period Tinc and the cumulative oxygen excess/deficiency ΣOED in a single oxygen decrease time period Tdec are used as the basis to update the learning value sfbg. However, the total value of the cumulative oxygen excess/deficiency ΣOED in a plurality of oxygen increase time periods Tinc and the total value of the cumulative oxygen excess/deficiency ΣOED in a plurality of oxygen decrease time periods Tdec may be used as the basis to update the learning value sfbg.

Further, in the above embodiment, the learning value sfbg is used as the basis to correct the air-fuel ratio correction amount AFC (that is, target air-fuel ratio). However, the learning value sfbg may be used as the basis for correction of other parameters relating to the air-fuel ratio. As the other parameters, for example, the amount of fuel fed to the inside of the combustion chamber 5, the output current of the upstream side air-fuel ratio sensor 40 (that is, the air-fuel ratio which is detected by the upstream side air-fuel ratio sensor 40), the later explained air-fuel ratio serving as the center of control, etc. may be mentioned.

Note that, in the above embodiment, in the basic air-fuel ratio control, when the air-fuel ratio which was detected by the downstream side air-fuel ratio sensor 41 becomes the rich judgment air-fuel ratio or less, the target air-fuel ratio is switched to the lean air-fuel ratio. Further, when the cumulative oxygen excess/deficiency ΣOED becomes a predetermined switching reference value OEDref or more, the target air-fuel ratio is switched to the rich air-fuel ratio. However, as the basic air-fuel ratio control, it is also possible to use control where rich and lean are reversed from the above control. In this case, the target air-fuel ratio is switched to the rich air-fuel ratio when the air-fuel ratio which as detected by the downstream side air-fuel ratio sensor 41 becomes the lean judgment air-fuel ratio or less. Further, when the amount of oxygen release from the upstream side exhaust purification catalyst 20 when the target air-fuel ratio is switched to the rich air-fuel ratio becomes the switching reference release amount (corresponding to the switching reference storage amount), or more, the target air-fuel ratio is switched to the lean air-fuel ratio.

In this case, as the absolute value of the cumulative oxygen excess/deficiency in the oxygen decrease time period from which the target air-fuel ratio is switched to the rich air-fuel ratio to when the amount of oxygen release from the upstream side exhaust purification catalyst 20 becomes the switching reference release amount, the rich cumulative value of amount of oxygen is calculated. In addition, as the absolute value of the cumulative oxygen excess/deficiency in the oxygen increase time period from which the target air-fuel ratio is switched to the lean air-fuel ratio to when the air-fuel ratio which is detected by the downstream side air-fuel ratio sensor becomes the lean judgment air-fuel ratio or more, the lean cumulative value of amount of oxygen is calculated. Further, the difference between these rich cumulative value of amount of oxygen and lean cumulative value of amount of oxygen is made to become smaller by correction of the output current of the upstream side air-fuel ratio sensor 40.

Therefore, summarizing the above, in the present embodiment, when the air-fuel ratio which is detected by the downstream side air-fuel ratio sensor 41 reaches a judgment air-fuel ratio which is offset to one side of either the rich side or lean side from the stoichiometric air-fuel ratio, the target air-fuel ratio is switched to an air-fuel ratio which is offset to the other side from the stoichiometric air-fuel ratio at the opposite side to that one side. In addition, the target air-fuel ratio is switched to the air-fuel ratio which is offset to one side from the stoichiometric air-fuel ratio when the amount of change of the stored amount of oxygen of the upstream side exhaust purification catalyst 20 after the target air-fuel ratio is switched becomes a predetermined switching reference amount or more. Further, an absolute value of cumulative oxygen excess/deficiency at a first time period from which the target air-fuel ratio is switched to an air-fuel ratio which is offset to the other side from the stoichiometric air-fuel ratio to when the amount of change of the stored amount of oxygen becomes the switching reference amount or more, constituting a first cumulative value of amount of oxygen, and an absolute value of cumulative oxygen excess/deficiency at a second time period from which the target air-fuel ratio is switched to an air-fuel ratio which is offset to the one side from the stoichiometric air-fuel ratio to when the air-fuel ratio which is detected by the downstream side air-fuel ratio detection device becomes the judgment air-fuel ratio or less, constituting a second cumulative value of amount of oxygen, are used as the basis to correct a parameter relating to the air-fuel ratio so that a difference between these first cumulative value of amount of oxygen and second cumulative value of amount of oxygen becomes smaller.

<Explanation of Specific Control>

Figure 11:
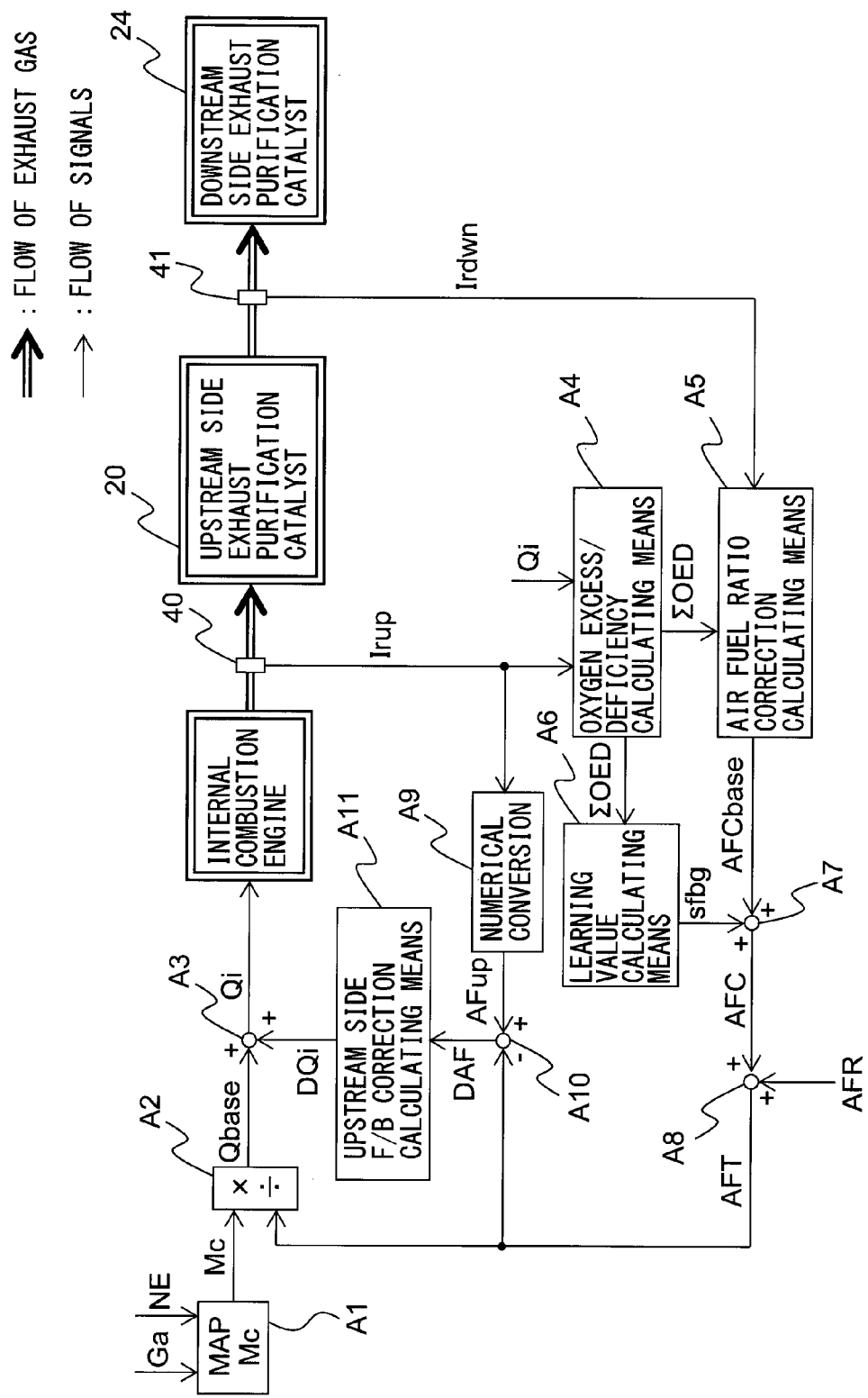
FIG. 11 is a functional block diagram of a control device.
Figure 12:
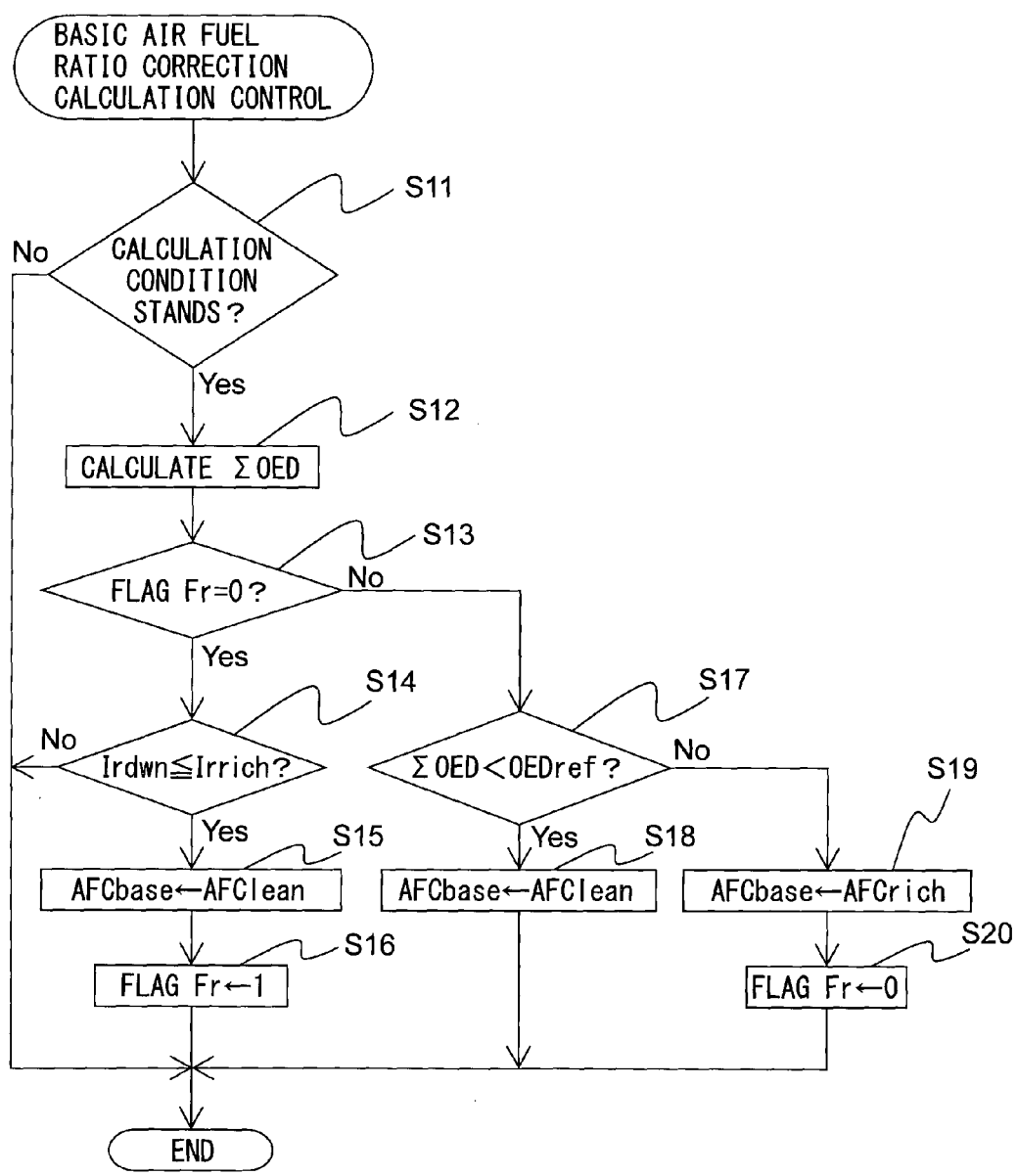
FIG. 12 is a flow chart which shows a control routine of control for calculation of a base air-fuel ratio correction amount.
Figure 13:
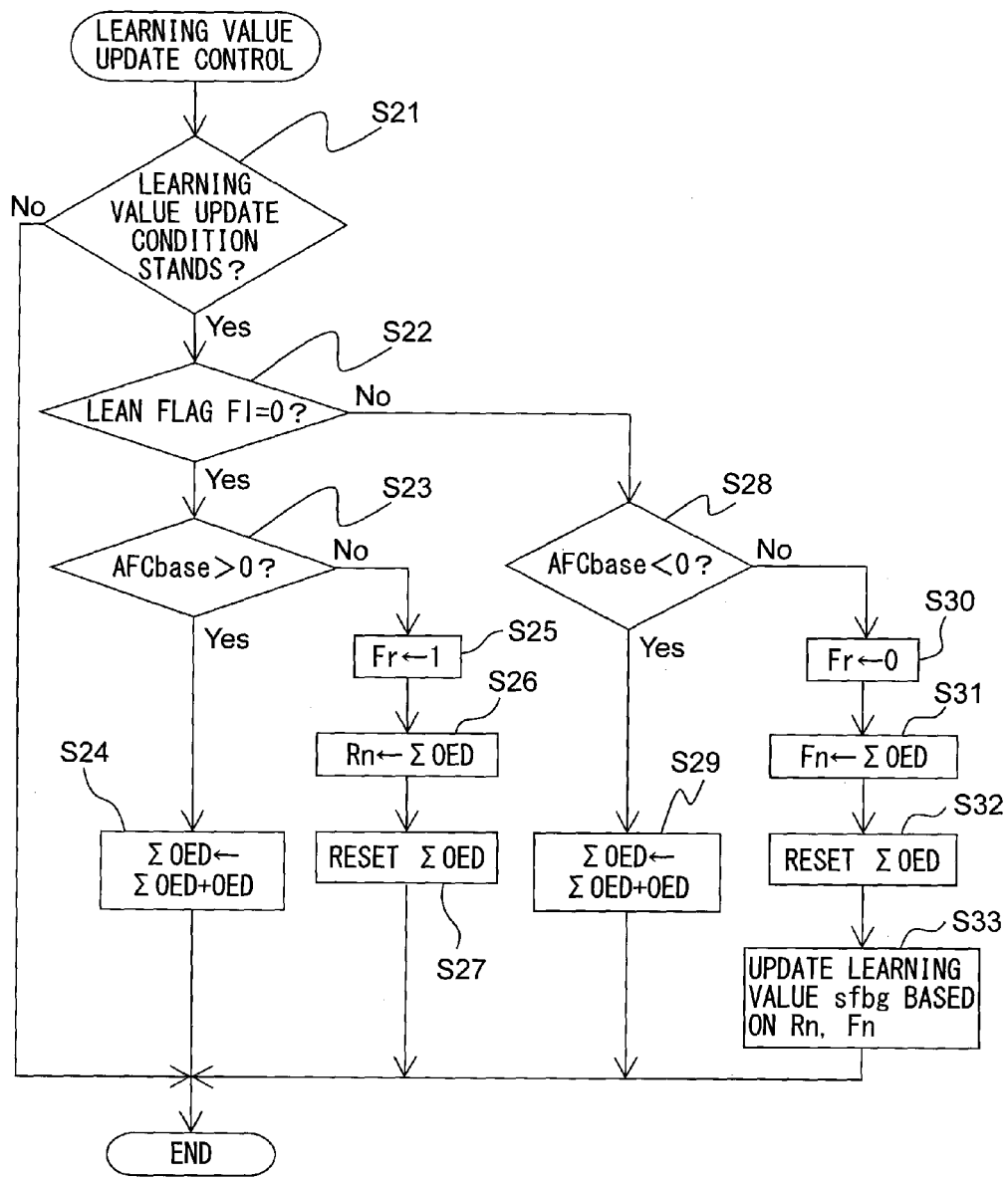
FIG. 13 is a flow chart which shows a control routine of control for updating a learning value.

Next, referring to FIG. 11 to FIG. 13, the control device in the above embodiment will be specifically explained. The control device in the present embodiment is configured including the functional blocks A1 to A11 of the block diagram of FIG. 11. Below, while referring to FIG. 11, the different functional blocks will be explained. The operations of these functional blocks A1 to A11 are basically executed by the ECU 31.

<Calculation of Fuel Injection Amount>

First, calculation of the fuel injection amount will be explained. In calculating the fuel injection amount, the cylinder intake air calculating means A1, basic fuel injection calculating means A2, and fuel injection calculating means A3 are used.

The cylinder intake air calculating means A1 uses the intake air flow rate Ga, engine speed NE, and map or calculation formula which is stored in the ROM 34 of the ECU 31 as the basis to calculate the intake air amount Mc to each cylinder. The intake air flow rate Ga is measured by the air flow meter 39, while the engine speed NE is calculated based on the output of the crank angle sensor 44.

The basic fuel injection calculating means A2 divides the cylinder intake air amount Mc which was calculated by the cylinder intake air calculating means A1 by the target air-fuel ratio AFT to calculate the basic fuel injection amount Qbase (Qbase=Mc/AFT). The target air-fuel ratio AFT is calculated by the later explained target air-fuel ratio setting means A8.

The fuel injection calculating means A3 adds the later explained F/B correction amount DQi to the basic fuel injection amount Qbase which was calculated by the basic fuel injection calculating means A2 to calculate the fuel injection amount Qi (Qi=Qbase+DQi). Fuel of the thus calculated fuel injection amount Qi is injected from the fuel injector 11 by an injection being instructed to the fuel injector 11.

<Calculation of Target Air Fuel Ratio>

Next, calculation of the target air-fuel ratio will be explained. In calculating the target air-fuel ratio, the oxygen excess/deficiency calculating means A4, base air-fuel ratio correction amount calculating means A5, learning value calculating means A6, air-fuel ratio correction amount calculating means A7, and target air-fuel ratio setting means A8 are used.

The oxygen excess/deficiency calculating means A4 uses the fuel injection amount Qi which was calculated by the fuel injection calculating means A3 and the output current Irup of the upstream side air-fuel ratio sensor 40 as the basis to calculate the cumulative oxygen excess/deficiency ΣOED. The oxygen excess/deficiency calculating means A4, for example, multiplies the fuel injection amount Qi with the difference between the air-fuel ratio corresponding to the output current Irup of the upstream side air-fuel ratio sensor 40 and the stoichiometric air-fuel ratio and cumulatively adds the found values to calculate the cumulative oxygen excess/deficiency ΣOED.

In the base air-fuel ratio correction amount calculating means A5, the cumulative oxygen excess/deficiency ΣOED which was calculated by the oxygen excess/deficiency calculating means A4 and the output current Irdwn of the downstream side air-fuel ratio sensor 41 are used as the basis to calculate the base air-fuel ratio correction amount AFCbase of the target air-fuel ratio. Specifically, the flow chart which is shown in FIG. 12 is used as the basis to calculate the base air-fuel ratio correction amount AFCbase.

In the learning value calculating means A6, the cumulative oxygen excess/deficiency ΣOED which was calculated by the oxygen excess/deficiency calculating means A4 is used as the basis to calculate the learning value sfbg. Specifically, the flow chart which is shown in FIG. 13 is used as the basis to calculate the learning value sfbg. The thus calculated learning value sfbg is stored in a storage medium in the RAM 33 of the ECU 31 which is not erased even if the ignition switch of the vehicle which mounts the internal combustion engine is turned to off.

In the air-fuel ratio correction amount calculating means A7, the base air-fuel ratio correction amount AFCbase which was calculated by the base air-fuel ratio correction amount calculating means A5 and the learning value sfbg which was calculated by the learning value calculating means A6 are used as the basis to calculate the air-fuel ratio correction amount AFC. Specifically, as shown in the above mentioned formula (3), the learning value sfbg is added to the base air-fuel ratio correction amount AFCbase to thereby calculate the air-fuel ratio correction amount AFC.

The target air-fuel ratio setting means A8 adds the calculated air-fuel ratio correction amount AFC which was calculated by the target air-fuel ratio correction calculating means A5 to the air-fuel ratio serving as the center of control (in the present embodiment, stoichiometric air-fuel ratio) AFR to calculate the target air-fuel ratio AFT. The thus calculated target air-fuel ratio AFT is input to the basic fuel injection calculating means A2 and later explained air-fuel ratio deviation calculating means A10. Note that, "air-fuel ratio serving as center of control" means the air-fuel ratio covered by addition of the air-fuel ratio correction amount AFC in accordance with the engine operating condition, that is, the air-fuel ratio serving as the reference when changing the target air-fuel ratio in accordance with the air-fuel ratio correction amount AFC.

<Calculation of F/B Correction Amount>

Next, calculation of the F/B correction amount based on the output current Irup of the upstream side air-fuel ratio sensor 40 will be explained. In calculating the F/B correction amount, a numerical converting means A9, air-fuel ratio deviation calculating means A10, and F/B correction calculating means A11 are used.

The numerical converting means A9 uses the output current Irup of the upstream side air-fuel ratio sensor 40 and a map or calculation formula which defines the relationship between the output current Irup of the air-fuel ratio sensor 40 and air-fuel ratio (for example, map such as shown in FIG. 5) as the basis to calculate the upstream side exhaust air-fuel ratio AFup. Therefore, the upstream side exhaust air-fuel ratio AFup corresponds to the air-fuel ratio of the exhaust gas which flows into the upstream side exhaust purification catalyst 20.

The air-fuel ratio deviation calculating means A10 subtracts the target air-fuel ratio AFT which was calculated by the target air-fuel ratio setting means A8 from the upstream side exhaust air-fuel ratio AFup which was found by the numerical converting means A9 to calculate the air-fuel ratio deviation DAF (DAF-AFup AFT). This air-fuel ratio deviation DAF is a value which expresses the excess/deficiency of the amount of fuel feed to the target air-fuel ratio AFT.

The F/B correction calculating means A11 processes the air-fuel ratio deviation DAF which was calculated by the air-fuel ratio deviation calculating means A10 by proportional integral derivative processing (PID processing) to calculate the F/B correction amount DFi for compensating for the excess/deficiency of the fuel feed amount based on the following formula (4). The thus calculated F/B correction amount DFi is input to the fuel injection calculating means A3.

$$DFi = Kp \cdot DAF + Ki \cdot SDAF + Kd \cdot DDAF \tag{4}$$

Note that, in the above formula (4), Kp is a preset proportional gain (proportional constant), Ki is a preset integral gain (integral constant), and Kd is a preset derivative gain (derivative constant). Further, DDAF is the time derivative of the air-fuel ratio deviation DAF and is calculated by dividing the deviation between the currently updated air-fuel ratio deviation DAF and the previously updated air-fuel ratio deviation DAF by a time corresponding to the updating interval. Further, SDAF is the time integral of the air-fuel ratio deviation DAF. This time derivative DDAF is calculated by adding the currently updated air-fuel ratio deviation DAF to the previously updated time integral DDAF (SDAF=DDAF+DAF).

<Flow Chart>

FIG. 12 is a flow chart which shows the control routine for control for calculating the base air-fuel ratio correction amount AFCbase. The illustrated control routine is performed by interruption every certain time interval.

As shown in FIG. 11, first, at step S11, it is judged if the condition for calculation of the base air-fuel ratio correction amount AFCbase stands. As the case where the condition for calculation of the base air-fuel ratio correction amount AFCbase stands, normal operation being performed, for example, the later explained fuel cut control not being under way etc. may be mentioned. When it is judged at step S11 that the condition for calculation of the target air-fuel ratio stands, the routine proceeds to step S12. At step S12, the output current Irup of the upstream side air-fuel ratio sensor 40 and the fuel injection amount Qi are used as the basis to calculate the cumulative oxygen excess/deficiency ΣOED.

Next, at step S13, it is judged if the lean set flag Fr has been set to 0. The lean set flag Fr is made 1 if the base air-fuel ratio correction amount AFCbase is set to the lean set correction amount AFClean and is made 0 if otherwise. When at step S13 the lean set flag Fr is set to 0, the routine proceeds to step S14. At step S14, it is judged if the output current Irdwn of the downstream side air-fuel ratio sensor 41 is the rich judgment reference value Irrich or less. If it is judged that the output current Irdwn of the downstream side air-fuel ratio sensor 41 is larger than the rich judgment reference value Irrich, the control routine is made to end.

On the other hand, if the upstream side exhaust purification catalyst 20 decreases in stored amount of oxygen OSA and the exhaust gas which flows out from the upstream side exhaust purification catalyst 20 falls in air-fuel ratio, at step S14, it is judged that the output current Irdwn of the downstream side air-fuel ratio sensor 41 is the rich judgment reference value Irrich or less. In this case, the routine proceeds to step S15 where the base air-fuel ratio correction amount AFCbase is made the lean set correction amount AFClean. Next, at step S16, the lean set flag Fr is set to 1, then the control routine is made to end.

At the next control routine, at step S13, it is judged that the lean set flag Fr is not set to 0, then the routine proceeds to step S17. At step S18, it is judged if the cumulative oxygen excess/deficiency ΣOED which was calculated at step S12 is smaller than the judgment reference value OEDref. When it is judged that the cumulative oxygen excess/deficiency ΣOED is smaller than the judgment reference value OEDref, the routine proceeds to step S18 where the base air-fuel ratio correction amount AFCbase is then made the lean set correction amount AFClean. On the other hand, if the upstream side exhaust purification catalyst 20 increases in the stored amount of oxygen, finally, at step S17, it is judged that the cumulative oxygen excess/deficiency ΣOED is the judgment reference value OEDref or more and the routine proceeds to step S19. At step S19, the base air-fuel ratio correction amount AFCbase is made the weak rich set correction amount AFCrich, next, at step S20, the lean set flag Fr is reset to 0, then the control routine is made to end.

FIG. 13 is a flow chart which shows the control routine of control for updating the learning value sfbg. The illustrated control routine is performed by interruption every certain time interval.

As shown in FIG. 13, first, at step S21, it is judged if the condition for updating the learning value sfbg stands. As the case when the condition for updating stands, for example, normal control being under way etc. may be mentioned. When it is judged at step S21 that the condition for updating the learning value sfbg stands, the routine proceeds to step S22. At step S22, it is judged if the lean flag Fr has been set to 1. When it is judged at step S22 that the lean flag S22 has been set to 0, the routine proceeds to step S23.

At step S23, it is judged if the base air-fuel ratio correction amount AFCbase is larger than 0, that is, if the target air-fuel ratio is a lean air-fuel ratio. If, at step S23, it is judged that the base air-fuel ratio correction amount AFCbase is larger than 0, the routine proceeds to step S24. At step S24, the cumulative oxygen excess/deficiency ΣOED is increased by the current oxygen excess/deficiency OED.

After this, if the target air-fuel ratio is switched to the rich air-fuel ratio, at the next control routine, at step S23, it is judged if the base air-fuel ratio correction amount AFCbase is 0 or less and the routine proceeds to step S25. At step S25, the lean flag Fr is set to 1, next, at step S26, Rn is made the absolute value of the current cumulative oxygen excess/deficiency ΣOED. Next, at step S27, the cumulative oxygen excess/deficiency ΣOED is reset to 0 and the control routine is made to end.

On the other hand, if the lean flag Fr is set to 1, at the next control routine, the routine proceeds from step S22 to step S28. At step S28, it is judged if the base air-fuel ratio correction amount AFCbase is smaller than 0, that is, the target air-fuel ratio is the rich air-fuel ratio. When it is judged at step S28 that the base air-fuel ratio correction amount AFCbase is smaller than 0, the routine proceeds to step S29. At step S29, the cumulative oxygen excess/deficiency ΣOED is increased by the current oxygen excess/deficiency OED.

After this, if the target air-fuel ratio is switched to the lean air-fuel ratio, at step S28 of the next control routine, it is judged that the base air-fuel ratio correction amount AFCbase is 0 or more, then the routine proceeds to step S30. At step S30, the lean flag Fr is set to 0, then, at step S31, Fn is made the absolute value of the current cumulative oxygen excess/deficiency ΣOED. Next, at step S32, the cumulative oxygen excess/deficiency ΣOED is reset to 0. Next, at step S33, the Rn which was calculated at step S26 and the Fn which was calculated at step S31 are used as the basis to update the learning value sfbg, then the control routine is made to end.

<Second Embodiment>

Next, referring to FIG. 14 and FIG. 15, a control device according to a second embodiment of the present invention will be explained. The configuration and control of the control device of the second embodiment are basically similar to the configuration and control of the control device of the first embodiment. However, in the second embodiment, even if normal control is made to end in the middle of the oxygen decrease time period, the learning value is updated.

In this regard, in an internal combustion engine which is mounted in a vehicle, deceleration of the vehicle etc. causes fuel cut control. Fuel cut control is control which feeds fuel to the combustion chamber 5 during operation of the internal combustion engine. During the execution of this fuel cut control, the above mentioned normal control is suspended. That is, during the execution of this fuel cut control, the air-fuel ratio of the exhaust gas which flows into the upstream side exhaust purification catalyst 20 is made the target air-fuel ratio by suspending the feedback control of the amount of fuel which is fed to the combustion chamber 5.

In addition, for example, when rapid acceleration of the vehicle is necessary, feed increase control is performed to temporarily increase the amount of feed of fuel to the inside of the combustion chamber 5. When such feed increase control is performed, feedback control is suspended. Furthermore, for example, in an internal combustion engine in which an engine automatic shutdown/startup device is provided which automatically makes the internal combustion engine stop and restart while the vehicle is stopped, feedback control is made to stop even when the engine automatic shutdown/startup device causes the internal combustion engine to stop.

In this regard, as explained above, the learning value is updated based on the cumulative oxygen excess/deficiency in the oxygen increase time period and the succeeding oxygen decrease time period. For this reason, in the above mentioned control for updating the learning value, updating the learning value requires cumulatively adding the oxygen excess/deficiency over a cycle comprised of an oxygen increase time period and oxygen decrease time period (or a plurality of cycles). In this regard, while depending on the operating condition, the fuel cut control is frequently performed. For this reason, sometimes fuel cut control is performed again after the fuel cut control ends and before this cycle elapses. In the same way, feed increase control is performed before this cycle elapses or the internal combustion engine is stopped by an engine automatic shutdown/startup device.

In this way, if the above mentioned start of fuel cut control or other condition for suspension of feedback control stands before one cycle elapses, the learning value cannot be updated. Therefore, if the condition for suspension of feedback control repeatedly stands before one cycle elapses, it ends up becoming impossible to update the learning value over a long time period.

Therefore, in the present embodiment, even when the condition for suspension of feedback control stands during the oxygen decrease time period, the learning value is updated. Specifically, when the following two conditions are satisfied when the condition for suspension of feedback control stands, the learning value is updated. One condition is that feedback control is suspended during the oxygen decrease time period after the oxygen increase time period in one cycle. The second condition is that the absolute value of the cumulative oxygen excess/deficiency ΣODE at the oxygen decrease time period until feedback control is suspended is larger than the absolute value of the cumulative oxygen excess/deficiency ΣODE at the oxygen increase time period. Here, the oxygen decrease time period up to when feedback control is suspended is more specifically the time period from switching the target air-fuel ratio to the rich set air-fuel ratio to when feedback control is suspended and will hereinafter be referred to as the "partial oxygen decrease time period".

When the two above conditions when the feedback control is suspended are satisfied, the difference between the cumulative oxygen excess/deficiency ΣODE at the oxygen increase time period and the cumulative oxygen excess/deficiency ΣODE at the partial oxygen decrease time period is made smaller by correcting the air-fuel ratio correction amount AFC. On the other hand, when these conditions are not satisfied, the air-fuel ratio correction amount AFC is not corrected. That is, when feedback control is suspended during the oxygen increase time period in one cycle, the air-fuel ratio correction amount AFC is not corrected. In addition, even when the absolute value of the cumulative oxygen excess/deficiency ΣODE in the oxygen increase time period becomes smaller than the absolute value of the cumulative oxygen excess/deficiency ΣODE in the partial oxygen decrease time period, the air-fuel ratio correction amount AFC is not corrected.

Figure 14:
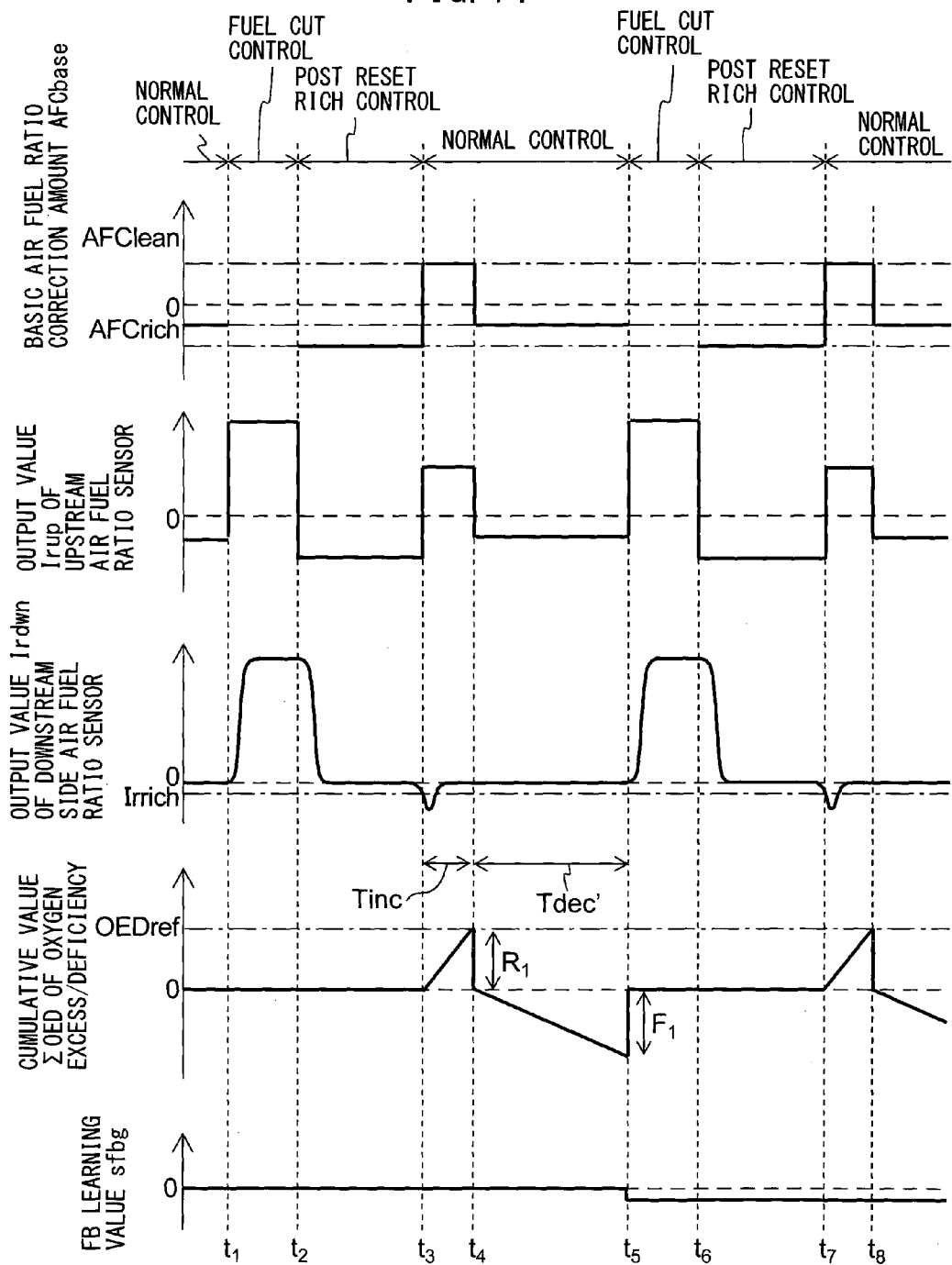
FIG. 14 is a flow chart which shows a control routine of control for calculating an air-fuel ratio correction amount in a second embodiment.

FIG. 14 is a time chart of the base air-fuel ratio correction amount AFCbase etc. in the case where fuel cut control is performed. In the example which is shown in FIG. 14, fuel cut control is performed at the time $t_1$ to time $t_2$ and the time $t_5$ to time $t_6$.

As shown in FIG. 14, if, at the time $t_1$, fuel cut control is performed, the fuel injection from the fuel injector 11 is stopped. For this reason, calculation of the base air-fuel ratio correction amount AFCbase is also stopped. Further, if fuel cut control is started, the air-fuel ratio of the exhaust gas which flows into the upstream side exhaust purification catalyst 20 becomes a lean air-fuel ratio with an extremely large lean degree. The air-fuel ratio of the exhaust gas which flows out from the upstream side exhaust purification catalyst 20 delayed slightly from this also becomes a lean air-fuel ratio with an extremely large lean degree. For this reason, the output current Irup of the upstream side air-fuel ratio sensor 40 and the output current Irdwn of the downstream side air-fuel ratio sensor become extremely large values. Feedback control is not performed from when fuel cut control is started at the time $t_1$ to when fuel cut control is ended at the time $t_2$. Further, control to update the learning value is also not performed.

After this, if, at the time $t_2$, fuel cut control is ended, post reset rich control is performed to release the large amount of oxygen which is stored in the upstream side exhaust purification catalyst 20 during the fuel cut control. In post reset rich control, the base air-fuel ratio correction amount AFCbase is set to a value smaller than the rich set correction amount AFCrich. That is, the target air-fuel ratio is set to an air-fuel ratio which is richer than the rich set air-fuel ratio. Due to this, the output current Irup of the upstream side air-fuel ratio sensor 40 becomes a value smaller than 0 (corresponding to rich air-fuel ratio), while the output current Irdwn of the downstream side air-fuel ratio sensor 41 becomes substantially 0 (corresponding to stoichiometric air-fuel ratio). After this, if the upstream side exhaust purification catalyst 20 becomes substantially zero in stored amount of oxygen OSA, the output current Irdwn of the downstream side air-fuel ratio sensor 41 becomes the rich judgment reference value irrich or less (time $t_3$). Due to this, the post reset rich control is ended and normal control is resumed.

At the time $t_3$, when normal control is restarted, at the time $t_3$, the output current Irdwn of the downstream side air-fuel ratio sensor 41 is the rich judgment reference value irrich or less, so the base air-fuel ratio correction amount AFCbase is set to the lean set correction amount AFClean. Further, from the time $t_3$ on, the oxygen excess/deficiency is cumulatively added. Next, if the cumulative oxygen excess/deficiency ΣOED at the time $t_3$ on becomes the switching reference value OEDref or more (time $t_4$), the base air-fuel ratio correction amount AFCbase is switched to the rich set correction amount AFCrich. For this reason, at the time $t_4$, the cumulative oxygen excess/deficiency ΣOED is reset to 0.

In the example which is shown in FIG. 14, after this, before the output current Irdwn of the downstream side air-fuel ratio sensor 41 reaches the rich judgment reference value irrich, at the time $t_5$, fuel cut control is started again due to deceleration of the vehicle etc. Therefore, fuel injection from the fuel injector 11 is stopped and calculation of the base air-fuel ratio correction amount AFCbase is stopped. For this reason, in the example which is shown in FIG. 14, fuel cut control is started during the oxygen decrease time period.

Here, in the example which is shown in FIG. 14, the absolute value F1 of the cumulative oxygen excess/deficiency ΣOED at the partial oxygen decrease time period Tdec' from the time $t_4$ to the time $t_5$ is larger than the absolute value $R_1$ of the cumulative oxygen excess/deficiency ΣOED at the oxygen increase time period Tinc from the time $t_3$ to the time $t_4$. Therefore, it will be understood that the output current of the upstream side air-fuel ratio sensor 40 is offset to the low side (rich side) by at least exactly the difference of these absolute values $R_1$ and $F_1$. Therefore, in the present embodiment, the difference AΣOED between the absolute value $R_1$ of the cumulative oxygen excess/deficiency ΣOED at the oxygen increase time period Tinc and the absolute value $F_1$ of the cumulative oxygen excess/deficiency ΣOED at the partial oxygen decrease time period Tdec' is used as the basis to correct the air-fuel ratio correction amount AFC. In particular, in the present embodiment, the difference ΔΣOED between the absolute value $R_1$ of the cumulative oxygen excess/deficiency ΣOED at the oxygen increase time period Tinc and the absolute value $F_1$ of the cumulative oxygen excess/deficiency ΣOED at the partial oxygen decrease time period Tdec' is made to become smaller by correcting the air-fuel ratio correction amount AFC. Specifically, the excess/deficiency error ΔΣOED is used as the basis to update the learning value using the above formula (2) and the above formula (3) is used to correct the air-fuel ratio correction amount AFC.

According to the present embodiment, it is possible to update the learning value before the elapse of one cycle comprised of the oxygen increase time period and oxygen decrease time period. Due to this, even if fuel cut control or feed increase control results in frequent suspension of feedback control, the learning value can be updated.

Figure 15:
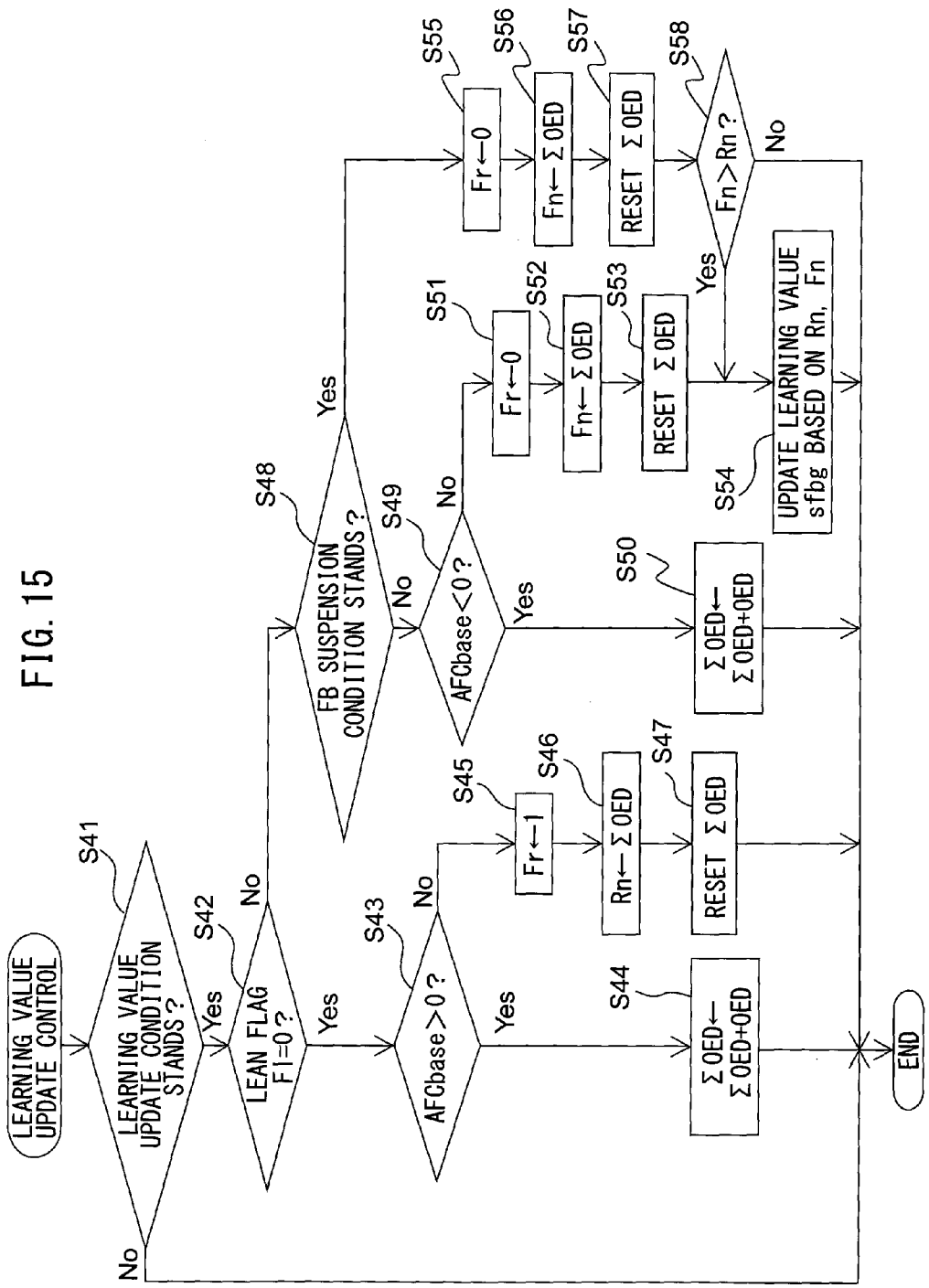
FIG. 15 is a flow chart which shows a control routine of control for calculating a learning value in a second embodiment.

FIG. 15 is a flow chart which shows a control routine of update control of the learning value sfbg in the present embodiment. The illustrated control routine is performed by interruption every certain time interval. Further, steps S41 to S47 and S49 to S54 are respectively similar to steps S21 to S27 and S28 to S33 of FIG. 13, so explanations will be omitted.

When it is judged at step S42 that the lean flag Fr is not set to 0, the routine proceeds to step S48. At step S48, it is judged if the condition for suspension of feedback control stands, that is, if normal control has ended. If it is judged at step S48 that the condition for suspension of feedback control does not stand, the routine proceeds to step S49. On the other hand, when it is judged that the condition for suspension of feedback control stands, the routine proceeds to step S55. At step S55, the lean flag Fr is set to 0, next, at step S56, Fn is made the absolute value of the current cumulative oxygen excess/deficiency ΣOED. Next, at step S57, the cumulative oxygen excess/deficiency ΣOED is reset to 0.

Next, at step S58, it is judged if the Fn which was calculated at step S56 is larger than the Rn which was calculated at step S46. When it is judged that Fn is Rn or less, the control routine is ended and the learning value sfbg is not updated. On the other hand, when it is judged that Fn is larger than Rn, the routine proceeds to step S54 where the learning value sfbg is updated.

REFERENCE SIGNS LIST

1 engine body
5 combustion chamber
7 intake port
9 exhaust port
19 exhaust manifold
20 upstream side exhaust purification catalyst
24 downstream side exhaust purification catalyst
31 ECU
40 upstream side air-fuel ratio sensor
41 downstream side air-fuel ratio sensor

The invention claimed is:

1. A control device of an internal combustion engine comprising an exhaust purification catalyst which is arranged in an exhaust passage of an internal combustion engine and which can store oxygen, which control device of an internal combustion engine comprises a downstream side air-fuel ratio detection device which is arranged at a downstream side of said exhaust purification catalyst in the exhaust flow direction and which detects an air-fuel ratio of exhaust gas flowing out from said exhaust purification catalyst, feed control means for controlling the feed of fuel which is fed to a combustion chamber of the internal combustion engine, and an excess/deficiency estimating means for estimating an oxygen excess/deficiency in said exhaust gas flowing into exhaust purification catalyst, wherein said feed control means performs feedback control on the feed of fuel fed to the combustion chamber of the internal combustion engine so that said air-fuel ratio of the exhaust gas which flows into exhaust purification catalyst becomes a target air-fuel ratio, and when an air-fuel ratio detected by said downstream side air-fuel ratio detection device reaches a judgment air-fuel ratio which is offset to one side of either a rich side or lean side from the stoichiometric air-fuel ratio, said target air-fuel ratio is switched to an air-fuel ratio which is offset to the other side at an opposite side to that one side from the stoichiometric air-fuel ratio and when an amount of change of said stored amount of oxygen of the exhaust purification catalyst after said target air-fuel ratio is switched becomes a predetermined switching reference amount or more, said target air-fuel ratio is switched to an air-fuel ratio which is offset to the one side from the stoichiometric air-fuel ratio, and wherein an absolute value of cumulative oxygen excess/deficiency at a first time period from which said target air-fuel ratio is switched to an air-fuel ratio which is offset to the other side from the stoichiometric air-fuel ratio to when the amount of change of said stored amount of oxygen becomes said switching reference amount or more, constituting a first cumulative value of amount of oxygen, and an absolute value of cumulative oxygen excess/deficiency at a second time period from which said target air-fuel ratio is switched to an air-fuel ratio which is offset to the one side from the stoichiometric air-fuel ratio to when the air-fuel ratio detected by said downstream side air-fuel ratio detection device becomes said judgment air-fuel ratio or less, constituting a second cumulative value of amount of oxygen, are used as the basis to correct a parameter relating to the air-fuel ratio so that a difference between these first cumulative value of amount of oxygen and second cumulative value of amount of oxygen becomes smaller.

2. The control device, of an internal combustion engine according to claim 1, wherein said parameter relating to the air-fuel ratio is corrected based on said first cumulative value of amount of oxygen at a first time period and said second cumulative value of amount of oxygen at a second time period following right after said first time period.

3. The control device of an internal combustion engine according to claim 1, wherein a difference of said first cumulative value of amount of oxygen and said second cumulative value of amount of oxygen is used as the basis to calculate a learning value, and said learning value is used as the basis to correct said parameter relating to the air-fuel ratio, and said learning value is stored in a storage medium which is not erased even if an ignition switch of a vehicle which carries said internal combustion engine is turned to off.

4. The control device of an internal combustion engine according to claim 1, wherein said one side is a rich side and said other side is a lean side.

5. The control device of an internal combustion engine according to claim 1, wherein the control device further comprises an upstream side air-fuel ratio detection device which is arranged at an upstream side of said exhaust purification catalyst in the exhaust flow direction and which detects the air-fuel ratio of the exhaust gas which flows into exhaust purification catalyst, and said excess/deficiency estimating means uses said air-fuel ratio detected by the upstream side air-fuel ratio detection device and the flow rate of said exhaust gas flowing into the exhaust purification catalyst or fuel injection amount as the basis to estimate said oxygen excess/deficiency.

6. The control device of an internal combustion engine according to claim 1, wherein said feed control means suspends said feedback control when a feedback control suspension condition stands, and wherein in the case where said feedback control is suspended during said second time period and, when an absolute value of cumulative oxygen excess/deficiency during a partial second time period from when said target air-fuel ratio is switched from the air-fuel ratio at the one side from the stoichiometric air-fuel ratio to when said feedback control is suspended, constituting a partial second cumulative value of amount of oxygen, is larger than the first cumulative value of amount of oxygen in said first time period right before said second time period, a parameter relating to the air-fuel ratio is corrected so that the difference between said first cumulative value of amount of oxygen and said partial second cumulative value of amount of oxygen becomes smaller.

7. The control device of an internal combustion engine according to claim 6, wherein even if said feedback control is suspended during said second time period, when said partial second cumulative value of amount of oxygen is smaller than said first cumulative value of amount of oxygen in said first time period right before said partial second time period, said parameter relating to the air-fuel ratio is not corrected.

8. The control device of an internal combustion engine according to claim 6, wherein said feedback control suspension condition is at least one of execution of fuel cut control which suspends the feed of fuel to the inside of the combustion chamber during operation of said internal combustion engine, execution of feed increase control which temporarily increases the feed of fuel to the inside of the combustion chamber, and shutdown of the internal combustion engine by an engine automatic shutdown/startup device.

9. The control device of an internal combustion engine according to claim 1, wherein said parameter relating to the air-fuel ratio is said target air-fuel ratio or fuel feed amount.

10. The control device of an internal combustion engine according to claim 1, wherein said parameter relating to the air-fuel ratio is an air-fuel ratio serving as a center of control.

11. The control device of an internal combustion engine according to claim 10, wherein said air-fuel ratio serving as the center of control is the stoichiometric air-fuel ratio.

12. The control device of an internal combustion engine according to claim 1, wherein the control device is further provided with an upstream side air-fuel ratio detection device which is arranged at an upstream side of said exhaust purification catalyst in the exhaust flow direction and which detects the air-fuel ratio of the exhaust gas flowing into exhaust purification catalyst, said feed control means controls, by feedback control, the amount of feed of fuel which is fed to the combustion chamber of the internal combustion engine so that the air-fuel ratio detected by said upstream side air-fuel ratio detection device becomes a target air-fuel ratio, and said parameter relating to the air-fuel ratio is the output value of said upstream side air-fuel ratio detection device.

* * * * *